US008423197B2

(12) United States Patent
Sakurai et al.

(10) Patent No.: US 8,423,197 B2

(45) Date of Patent: Apr. 16, 2013

(54) APPARATUS FOR CONTROLLING THE ENERGIZING OF A HEATER

(75) Inventors: Takayuki Sakurai, Komaki (JP); Takayuki Ohtani, Iwakura (JP); Hiroki Tsuchiya, Komaki (JP)

(73) Assignee: NGK Spark Plug Co., Ltd., Aichi (JP)

( * ) Notice: Subject to any disclaimer, the term of this patent is extended or adjusted under 35 U.S.C. 154(b) by 626 days.

(21) Appl. No.: 12/623,812

(22) Filed: Nov. 23, 2009

(65) Prior Publication Data

US 2010/0161150 A1 Jun. 24, 2010

(30) Foreign Application Priority Data

Nov. 25, 2008 (JP) ................................. 2008-299995
Nov. 25, 2008 (JP) ................................. 2008-300009

(51) Int. Cl.
*G05D 23/19* (2006.01)

(52) U.S. Cl.
USPC ............. 700/296; 700/300; 700/299; 700/30; 700/31

(58) Field of Classification Search ........................ None
See application file for complete search history.

(56) References Cited

U.S. PATENT DOCUMENTS

| | | | | |
|---|---|---|---|---|
| 4,260,985 | A * | 4/1981 | Hayden | 340/635 |
| 4,500,775 | A * | 2/1985 | Sangu et al. | 219/497 |
| 4,694,145 | A * | 9/1987 | Romstadt et al. | 219/497 |
| 4,726,333 | A * | 2/1988 | Verheyen | 123/145 A |
| 4,858,576 | A * | 8/1989 | Jeffries et al. | 123/145 A |
| 4,862,370 | A * | 8/1989 | Arnold et al. | 701/113 |
| 5,122,968 | A * | 6/1992 | Bauer et al. | 702/58 |
| 5,144,922 | A * | 9/1992 | Kong | 123/145 A |
| 5,724,932 | A * | 3/1998 | Antone | 123/145 A |
| 5,729,456 | A * | 3/1998 | Boisvert et al. | 701/99 |
| 6,009,369 | A * | 12/1999 | Boisvert et al. | 701/99 |
| 6,148,258 | A * | 11/2000 | Boisvert et al. | 701/99 |
| 6,637,392 | B2 * | 10/2003 | Jung | 123/145 A |
| 6,712,032 | B2 * | 3/2004 | Uhl et al. | 123/145 A |
| 7,234,430 | B2 * | 6/2007 | Toedter et al. | 123/179.6 |

(Continued)

FOREIGN PATENT DOCUMENTS

| | | | |
|---|---|---|---|
| EP | 0992680 | A1 * | 4/2000 |
| JP | 55-066667 | | 5/1980 |

(Continued)

OTHER PUBLICATIONS

Japanese Office Action issued on Dec. 4, 2012 in corresponding Japanese Application No. JP 2008-299995.

*Primary Examiner* — Jeffrey A Gaffin
*Assistant Examiner* — Christopher E Everett
(74) *Attorney, Agent, or Firm* — Sughrue Mion, PLLC

(57) ABSTRACT

A heater energization control apparatus. When an engine is stopped, a microcomputer of a GCU enters a power save mode. When the microcomputer returns to a normal mode in response to an interruption signal periodically generated from an interruption timer, the microcomputer supplies electricity to a heating resistor for a short time and obtains its resistance (S19). When the resistance is greater than a first reference value, the microcomputer determines that a glow plug is removed from the engine; that is, the glow plug is being exchanged (S29). The microcomputer sets an exchange flag to "1" (S30), and performs calibration for the heating resistor of a new glow plug after the engine is operated next time (S35). When the current resistance becomes smaller than the past resistance, the microcomputer determines that the glow plug has been exchanged.

10 Claims, 9 Drawing Sheets

U.S. PATENT DOCUMENTS

| | | | | |
|---|---|---|---|---|
| 7,319,208 | B2 * | 1/2008 | Gotoh et al. | 219/270 |
| 7,431,004 | B2 * | 10/2008 | Kernwein et al. | 123/145 A |
| 7,711,498 | B2 * | 5/2010 | Hiramatsu | 702/34 |
| 7,730,864 | B2 * | 6/2010 | Toedter et al. | 123/145 A |
| 7,957,885 | B2 * | 6/2011 | Kernwein et al. | 701/102 |
| 8,082,090 | B2 * | 12/2011 | Kernwein et al. | 701/102 |
| 2001/0050275 | A1 * | 12/2001 | Uhl | 219/270 |
| 2006/0289457 | A1 * | 12/2006 | Baecker et al. | 219/497 |
| 2007/0056545 | A1 * | 3/2007 | Kernwein et al. | 123/145 A |
| 2008/0319631 | A1 * | 12/2008 | Kernwein et al. | 701/102 |
| 2009/0265086 | A1 * | 10/2009 | Iihoshi et al. | 701/113 |
| 2009/0316328 | A1 * | 12/2009 | Kernwein et al. | 361/264 |
| 2010/0082219 | A1 * | 4/2010 | Ma | 701/102 |

FOREIGN PATENT DOCUMENTS

| | | | |
|---|---|---|---|
| JP | 57-062966 | A | 4/1982 |
| JP | 1-280682 | A | 11/1989 |
| JP | 5-113166 | A | 5/1993 |
| JP | 5-256449 | A | 10/1993 |
| JP | 9-177650 | A | 7/1997 |
| JP | 11-182400 | A | 7/1999 |
| JP | 2004-006367 | A | 1/2004 |
| JP | 2004-44580 | A | 2/2004 |
| JP | 2005-240707 | A | 9/2005 |
| JP | 2009-168319 | A | 7/2009 |
| WO | WO 2007033825 | A1 * | 3/2007 |

* cited by examiner

APPARATUS FOR CONTROLLING THE ENERGIZING OF A HEATER

TECHNICAL FIELD

The Present invention relates to a heater energization control apparatus for controlling energization of a heater having a heating resistor which generates heat upon supply of electricity thereto.

BACKGROUND ART

Conventionally, in an automobile, a heater having a heating resistor which generates heat upon supply of electricity thereto is used, in combination with an energization control apparatus for performing energization control for the heater, in order to assist startup of an engine, stably operate the engine, or heat the compartment of the automobile. Further, a widely used heating resistor has a positive correlation between temperature and resistance such that resistance increases with temperature. Examples of known schemes for controlling supply of electricity to a heater having such a heating resistor include a constant power control scheme and a resistance control scheme.

In the constant power control scheme, the electric power supplied to the heating resistor is obtained from voltage applied to the heating resistor and current flowing therethrough, and electricity is supplied to the heater such that a cumulative electric energy obtained through integration of the electric power becomes equal to a predetermined electric energy. When constant power control is performed, the heating resistor generates heat in proportion to the supplied electric energy. Thus, the temperature of the heating resistor can be elevated to a predetermined temperature through supply of a certain amount of electric energy. Therefore, the temperature of the heating resistor can be readily managed. This is because the heat generation amount (i.e., temperature) of the heating resistor greatly depends on the quality of the material of the heating resistor, and the quality of the material of the heating resistor can be readily made uniform industrially. The constant power control scheme is suitable in particular for prevention of excessive temperature increase at the beginning of supply of electricity to the heating resistor. However, maintaining the temperature of the heating resistor is difficult when the heating resistor is thermally influenced from the outside; e.g., when the heating resistor is cooled by a disturbance.

Meanwhile, in the resistance control scheme, by taking advantage of the positive correlation between the temperature and resistance of the heating resistor, the supply of electricity to the heating resistor is controlled such that the resistance of the heating resistor approaches a target resistance corresponding to a temperature set as a temperature increasing target. The resistance control scheme is advantageous in that, even when the heating resistor is influenced by a temperature change caused by a disturbance, the temperature of the heating resistor can be readily maintained constant. However, even when heating resistors are formed of the same material of the same quality, variations in properties may arise due to slight changes in cross sectional area and/or density of the heating resistors within the tolerance of the products. Therefore, even among heating resistors of the same model number, a difference (variation) arises in the correlation between temperature and resistance because of individual variations in properties.

In view of the foregoing, a glow plug energization control apparatus used with, for example, a diesel engine performs constant power control for a glow plug at the time of startup of the engine at which fluctuations of disturbances are small, to thereby elevate the temperature of a heating resistor (a resistance heating heater) to a target temperature. After having elevated the temperature, the control apparatus switches its control mode from constant power control to resistance control so as to maintain the resistance of the heating resistor at that time, to thereby maintain the temperature of the heating resistor at the target temperature (see, for example, Patent Document 1).

Incidentally, in the case where the correlation between temperature and resistance is corrected (calibrated) for an individual heating resistor, the correlation between temperature and resistance can be made constant irrespective of individual variations in properties. That is, since a resistance of a heating resistor corresponding to a target temperature is univocally determined, resistance control can be readily performed. Since the resistance of the heating resistor changes due to deterioration with time, if such calibration is performed every time an engine is operated; for example, during pre-heating of a glow plug (during a temperature increasing operation for causing the temperature of the heating resistor to approach the target temperature), the resistance control can be performed accurately after the temperature increasing operation.

However, when the engine is cranked (started) in the middle of the pre-heating of the glow plug; i.e., in the middle of the calibration, a disturbance, such a swirl within the engine, injection of fuel, or the like, arises, and the heating resistor is partially cooled, whereby the accuracy of the calibration may drop. Further, in the case of a generally employed heating resistor, change in resistance with deterioration with time does not become large until the deterioration progresses to a certain degree. Therefore, during a period in which the influence of the deterioration of the heating resistor is small, the correlation calibrated during a period in which the engine is not cranked can be used until the glow plug is exchanged with a new one; that is, until the heating resistor is replaced with another one. In order to allow such an operation, the exchange of the glow plug must be reported to an energization control apparatus (GCU) for the glow plug. Therefore, when the glow plug is exchanged with a new one, an operator reports the exchange of the glow plug to the GCU by means of, for example, operating a switch, so as to cause the GCU to discard the calibrated correlation for the old glow plug and perform calibration for the new glow plug.

PRIOR ART DOCUMENTS

Patent Documents

[Patent Document 1] Japanese Patent Application Laid-Open (kokai) No. 2004-44580

SUMMARY OF THE INVENTION

Problems to be Solved by the Invention

However, if the operator having exchanged the glow plug fails to report the exchange of the glow plug to the GCU; for example, forgets to operate the above-mentioned switch, energization control is performed for the new glow plug on the basis of the correlation calibrated for the old glow plug. Depending on the individual variations in properties of the heating resistor, when the temperature of the heating resistor of the new glow plug is increased to the target temperature, the resistance of the heating resistor may become smaller than that of the heating resistor of the old glow plug at the target temperature. In such a case, if electric power is supplied to the heating resistor of the new glow plug such that the resistance of the heating resistor of the new glow plug becomes equal to that of the heating resistor of the old glow plug at the target temperature, the temperature of the heating resistor of the new glow plug may increase excessively.

The present invention has been accomplished so as to solve the above-described problem, and its object is to provide a heater energization control apparatus which can detect exchange of a heater.

Means for Solving the Problems

A first mode of the present invention is a heater energization control apparatus for controlling energization of a heater having a heating resistor which generates heat upon supply of electricity thereto, the apparatus comprising first resistance acquisition means, operable when an internal combustion engine to which the heater is mounted remains stopped, for supplying electricity to the heating resistor every time a predetermined wait time elapses and for acquiring, as a first resistance, an electricity supply resistance at that time; and determination means for determining that the heater has been exchanged, when the first resistance is greater than a predetermined first reference value.

According to the first mode of the present invention, in a period during which the internal combustion engine remains stopped, electricity is supplied to the heating resistor of the heater every time the wait time elapse so as to obtain the first resistance. When the first resistance is greater than the first reference value, the heater is determined to have been exchanged. That is, since electricity is not required to be continuously supplied to the heating resistor so as to detect exchange of the heater, consumption of energy accumulated when the internal combustion engine is operated can be suppressed.

Incidentally, since the heating resistor has an individual variation in terms of properties, accurate temperature control can be performed through performance of correction (calibration). In order to accurately perform such calibration, it is desired to prevent the heating resistor from being influenced by a disturbance or the like during the calibration; i.e., it is desired to perform the calibration when the internal combustion engine remains stopped. The calibration requires the supply of electricity to the heating resistor, and, if the supply of electricity is performed when the internal combustion engine remains stopped, the energy accumulated when the internal combustion engine is operated is consumed. In the case where exchange of the heater is detected as in the first mode, an operation of performing the calibration only when the heater is exchanged becomes possible, whereby consumption of energy can be suppressed. Further, in the case where the heater energization control apparatus cannot detect exchange of the heater by itself, exchange of the heater must be reported to the apparatus from the outside, and under some circumstances exchange of the heater may fail to be reported. In contrast, since the heater energization control apparatus according to the first mode of the present invention can detect exchange of the heater by itself, an operation (calibration or the like) triggered by exchange of the heater can be performed reliably.

In the first mode of the present invention, preferably, the wait time is shorter than a predetermined time required to exchange the heater mounted to the internal combustion engine. In a period during which the heater is being exchanged, the heating resistor is not present in an electricity supply path. Therefore, for detection of exchange of the heater, there can be used the result of determination as to whether or not the electricity supply resistance at the time when electricity is supplied to the heating resistor indicates an electrically insulated state (whether or not the electricity supply resistance is greater than the first reference value). In such a case, the detection of exchange of the heater can be performed simply and reliably. For such reliable detection, the supply of electricity to the heating resistor is desirably performed, without fail, in a period during which the heater to be exchanged is removed from the internal combustion engine; that is, the wait time is desirably shorter than the time required for exchange of the heater.

A second mode of the present invention is a heater energization control apparatus for controlling energization of a heater having a heating resistor which generates heat upon supply of electricity thereto, the apparatus comprising first resistance acquisition means, operable when an internal combustion engine to which the heater is mounted remains stopped, for supplying electricity to the heating resistor and for acquiring, as a first resistance, an electricity supply resistance at that time; first information acquisition means, operable when the first resistance is acquired, for acquiring information regarding a temperature of an environment in which the heater is used; correction means for correcting the first resistance on the basis of the information regarding the environmental temperature to thereby obtain a corrected value; first computation means for computing a difference between a current corrected value obtained by the correction means and a past corrected value previously obtained by the correction means; determination means for determining that the heater has been exchanged, when the difference is greater than a predetermined second reference value; and storage means for storing, as the past corrected value, the current corrected value obtained by the correction means.

According to the second mode of the present invention, in a period during which the internal combustion engine remains stopped, electricity is supplied to the heating resistor of the heater so as to obtain the first resistance, and the first resistance is corrected, whereby a corrected value is obtained. When the difference between the current corrected value and the past corrected value obtained previously is greater than the second reference value, the heater is determined to have been exchanged. The resistance of the heating resistor changes due to deterioration of the heating resistor with time. This change in the resistance can be detected as the above-described difference. Thus, when the difference exceeds the second reference value, a determination can be made that the degree of deterioration of the heating resistor with time has changed. Here, the expression "the degree of deterioration of the heating resistor with time has changed" means that the first resistance of the new heating resistor obtained at the time of exchange of the heater involves a change in resistance due to deterioration of the heating resistor with time. The exchange of the heater is detected on the basis of this change in the resistance. Accordingly, since exchange of the heater can be detected on the basis of the past corrected value obtained previously and the current corrected value, the timing of resistance acquisition is not required to be adjusted such that the resistance of the heating resistor is acquired while the heater is being exchanged. Further, since the supply of electricity to the heating resistor for detection of exchange of the heater is not required to be continuously performed, there can be suppressed consumption of energy stored when the internal combustion engine is operated.

The second mode of the present invention may be such that, when the past corrected value stored in the storage means is an initial value or zero, the determination means determines that the heater has been exchanged. In this case, a state where the corrected value becomes the initial value or zero (e.g., at the time of replacement of a battery or at the time of shipment) can be detected as a state similar to exchange of the heater, and an operation to be performed when the heater is exchanged (for example, correction for the individual variation of the heating resistor in properties) can be prompted.

In the first or second mode of the present invention, preferably, a cumulative amount of electric power which is supplied to the heating resistor when the first resistance acquisition means acquires the first resistance is determined such that a temperature of the heating resistor elevated through the supply of electric power drops to a temperature of the heating resistor before being supplied with the electric power due to natural heat radiation until the first resistance is acquired next time. Since the internal combustion engine remains stopped when the first resistance is acquired, the supply of electricity for acquisition of the first resistance results in consumption of energy accumulated when the internal combustion engine operates. Therefore, a restriction is desirably imposed on the cumulative amount of electric power supplied to the heating resistor. In the case where the cumulative amount of electric power supplied to the heating resistor is determined such that the temperature of the heating resistor elevated through the supply of electric power drops to the temperature of the heating resistor before being supplied with the electric power due to natural heat radiation until the first resistance is acquired next time, consumption of energy accumulated when the internal combustion engine operates can be suppressed sufficiently, which is preferred.

The heater energization control apparatus according to the first or second mode of the present invention may comprise first setting means for setting an operation clock of the heater energization control apparatus to generate clock pulses at a first frequency when the internal combustion engine remains stopped, and setting the operation clock to generate clock pulses at a second frequency higher than the first frequency when the first resistance acquisition means acquires the first resistance. Setting the operation clock of the heater energization control apparatus to generate clock pulses at the first frequency when the internal combustion engine remains stopped is preferred from the viewpoint of reduction in consumption of electric power in waiting periods. In the case where the operation clock is set to generate clock pulses at the second frequency when the first resistance is acquired, the operation of starting and stopping the supply of electricity for acquisition of the first resistance and the operation of detecting exchange of the heater can be performed quickly, whereby the amount of electric power consumed until these operations end can be suppressed. Accordingly, power consumption can be suppressed in periods during which the internal combustion engine remains stopped, including the above-described consumption of electric power in the waiting periods.

Further, in the first or second mode, the heating resistor may be a heating resistor whose resistance changes with a temperature change thereof in accordance with a positive correlation between the temperature and the resistance; and the heater energization control apparatus may be configured to control the supply of electricity to the heating resistor in accordance with a resistance control scheme in which the supply of electricity to the heating resistor is controlled such that the resistance of the heating resistor coincides with a target resistance. In this case, preferably, the heater energization control apparatus comprises second resistance acquisition means for supplying electricity to the heating resistor when the internal combustion engine is first operated after the heater is determined by the determination means to have been exchanged and then stopped, and for acquiring, as a second resistance, the electricity supply resistance at that time; second information acquisition means, operable when the second resistance is acquired, for acquiring information regarding the temperature of the environment in which the heater is used; second computation means for computing the target resistance on the basis of the second resistance and the information regarding the environmental temperature; and energization control means, operable when the internal combustion engine is operated, for controlling the supply of electricity to the heating resistor such that the electricity supply resistance at the time when electricity is supplied to the heating resistor coincides with the target resistance.

For example, when the engine is started (cranked) in the middle of an operation of elevating the temperature of a glow plug, the heating resistor of the glow plug may be partially cooled by a swirl produced within a combustion chamber or injected fuel. In such a case, the resistance of the heating resistor may change although the environmental temperature does not change. In the first or second mode, since the second resistance, which is used for calculation of the target resistance, is acquired when the internal combustion engine remains stopped, there does not occur a state in which the heating resistor receives the influences of disturbances produced when the engine is operated (e.g., cooling of the heating resistor by swirl or injected fuel), and the temperate and resistance of the heating resistor change temporarily. Therefore, the accuracy of the acquired second resistance is high, and, through supply of electricity to the heating resistor such that the electricity supply resistance coincides with the target resistance computed on the basis of the second resistance and the information regarding the environmental temperature, the control of maintaining the temperature of the heating resistor at the target temperature can be performed accurately. Since the heater energization control apparatus according to the first or second mode can determine by itself whether or not the heater has been exchanged, the second resistance can be obtained at the earliest timing after the exchange of the heater, among timings at which the heating resistor is not influenced by disturbances as described above; i.e., after the internal combustion engine is first operated and stopped after the heater has been exchanged.

In order to acquire the second resistance, electricity must be supplied to the heating resistor, and the supply of electricity is performed when the internal combustion engine remains stopped. Therefore, energy accumulated when the internal combustion engine operates is consumed. In the case where the second resistance is acquired only when the heater is exchanged as in the first or second mode, energy consumption can be suppressed.

Further, preferably, the heater energization control apparatus according to the first or second mode of the present invention comprises second setting means, operable after the determination means determines that the heater has been exchanged, for setting the second resistance to its initial value before the energization control means starts the control of the first supply of electricity to the heating resistor. At the point in time when the internal combustion engine is first operated after the heater has been exchanged, the second resistance corresponding to the new heating resistor has not yet been acquired. However, since the second resistance is set to its initial value, the supply of electricity to the heating resistor, which is controlled by use of the target resistance calculated from the second resistance, can be performed within a safe range in which excessive temperature rise is prevented. That is, desirably, the initial value can restrict the supply of electricity to the heating resistor to thereby prevent excessive temperature rise irrespective of the individual variation in properties of the heating resistor. No limitation is imposed on the timing at which the second resistance is set to its initial value, so long as the setting of the second resistance to its initial value is completed before the control on the supply of electricity to the heating resistor is first performed; that is, before the energization control (resistance control) using the target resistance is first performed, after the heater has been exchanged. Therefore, so long as the setting of the second resistance to its initial value is performed after the heater has been exchanged, the setting may be performed in a period during which the internal combustion engine remains stopped (e.g., immediately after the heater has been exchanged), when the heater is first used (e.g., when the engine key is turned on), or in a period during which the temperature of the heating resistor is elevated toward the target temperature. Alternatively, the second resistance may be set to its initial value at the time of shipment of the internal combustion engine after manufacture thereof.

Moreover, the heater energization control apparatus according to the first or second mode of the present invention may comprise deterioration detection means for detecting deterioration of the heating resistor on the basis of the first resistance. When deterioration of the heating resistor is detected by the deterioration detection means, preferably, the second resistance acquisition means acquires the second resistance and the second computation means calculates the target resistance every time the internal combustion engine is stopped. In this case, after deterioration of the heating resistor is detected, the second resistance is acquired and the target resistance is calculated every time the internal combustion engine is stopped. Thus, even when the resistance of the heating resistor changes with the degree of deterioration of the heating resistor, the energization control of the heating resistor can be carried out by making use of the accurate target resistance which follows the changing resistance of the heating resistor.

Further, in the heater energization control apparatus according to the first or second mode of the present invention, preferably, the supply of electricity to the heating resistor by the second resistance acquisition means is performed in accordance with a constant power control scheme such that the cumulative electric energy supplied to the heating resistor becomes equal to a predetermined electric energy. The cumulative electric energy is obtained by integrating electric power calculated from voltage applied to the heating resistor and current flowing through the heating resistor. Therefore, even when a variation in resistance arises among heating resistors due to individual variations in terms of properties, the heating resistors can generate an amount of heat corresponding to the cumulative electric energy supplied thereto if they are placed under the same conditions (for example, no disturbance is present, and the environmental temperature (e.g., water temperature) is constant). That is, if the cumulative electric energies supplied to the individual heating resistors are the same, the temperatures of the individual heating resistors become the same. Therefore, for the case where the relation between temperature and resistance of each heating resistor is obtained and the target resistance calculated on the basis thereon, employment of the constant power control scheme for the supply of electricity to the heating resistor is preferred.

Notably, in the first or second mode of the present invention, the heater may constitute a heat generation section of a glow plug used in the internal combustion engine.

MODE FOR CARRYING OUT THE PRESENT INVENTION

One embodiment of a heater energization control apparatus according to the present invention will now be described with reference to the drawings. In the present embodiment, a glow plug 20 which is used for assisting startup of a diesel engine (hereinafter, simply referred to as the "engine") 1 of an automobile and for improving operation stability of the engine is mentioned as an example of a heater, and a glow control apparatus (GCU) 30 which controls energization of the glow plug will be described as an example of the energization control apparatus. Notably, the accompanying drawings are used so as to describe technical features which the present invention can employ; the structure of the apparatus, flowcharts of various processings, etc. which are described herein are mere illustrative examples; and the present invention is not limited thereto unless stated otherwise.

Figure 1:
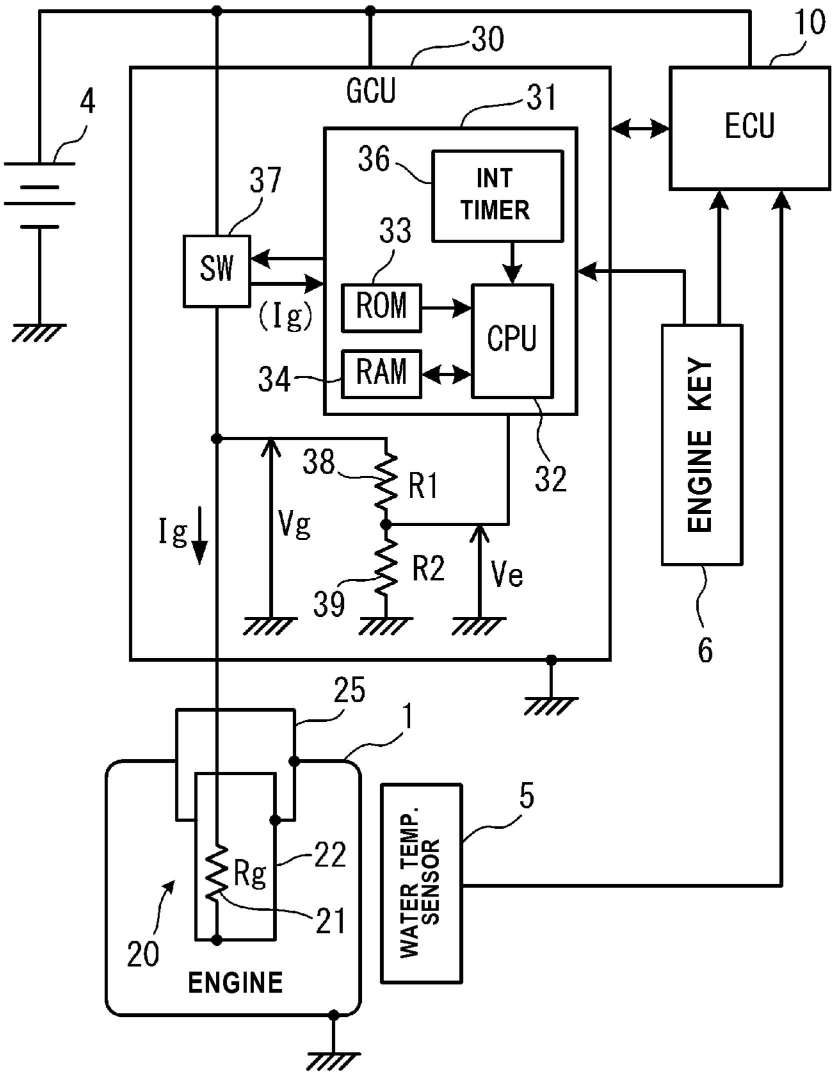
FIG. 1 Diagram showing the electrical configuration of a system in which a GCU 30 controls energization of a glow plug 20.

First, the schematic configuration of a system in which the GCU 30 controls energization of the glow plug 20 will be described with reference to FIG. 1. FIG. 1 is a diagram showing the electrical configuration of the system in which the GCU 30 controls energization of the glow plug 20.

Notably, FIG. 1 shows a single glow plug 20 for which the GCU 30 performs energization control; however, an actual internal combustion engine includes a plurality of cylinders, and glow plugs and switches corresponding thereto are provided in equal number to the cylinders. Although the GCU 30 performs the energization control for the glow plugs individually, the control method is the same among the glow plugs. Therefore, in the description of the present embodiment, energization control which the GCU 30 performs for a certain glow plug 20 will be described.

The GCU 30 shown in FIG. 1 is an apparatus for controlling the supply of electricity to (energization of) the glow plug 20 which is used so as to assist startup of the engine 1 of the automobile (an example of an internal combustion engine) and improve the operation stability of the engine. The GCU 30 receives electric power from a battery 4 so as to operate. The GCU 30 includes a well-known microcomputer 31 including a CPU 32, ROM 33, and RAM 34, and controls the energization of the glow plug 20 in accordance with various programs executed by the CPU 32.

This microcomputer 31 has, as operation modes, a normal mode for operating on the basis of operation clock pulses of a high oscillation frequency (second frequency) and a power save mode for operating on the basis of operation clock pulses of a low oscillation frequency (first frequency). When the engine 1 remains stopped (an engine key 6 is off), the microcomputer 31 enters the power save mode. In the power save mode, the microcomputer 31 stops execution of various programs and waits for input of an interruption signal. When an interruption signal is input, in response thereto, the microcomputer 31 returns to the normal mode and executes the various programs. In general, when the CPU 32 is started, it performs so-called initialization (initialization processing for, for example, clearing internal registers and RAM; resetting ports, drivers, etc.; setting the address of a processing program at the time of interruption; and setting flags, counters, etc. to their initial values). Since the microcomputer 31 of the present embodiment has such a power save mode, when it moves to the normal mode, the CPU 32 can start normal operation (execution of a program or the like) quickly, without performing initialization. Notably, the microcomputer 31, which sets the frequency of its own operation clock to the second frequency when moving to the normal mode and sets the frequency of the operation clock to the first frequency when moving to the power save mode, corresponds to the "first setting means" of the present invention.

In the present embodiment, the microcomputer 31 has an interruption timer 36. A signal periodically generated from the interruption timer 36 (in the present embodiment, at intervals of 60 seconds) is input to the CPU 32 as an interruption signal. Further, a signal (voltage) for reporting the on or off state of the engine key 6 is input to the microcomputer 31. This signal also serves as an interruption signal when the microcomputer 31 is in the power save mode.

Further, a switch 37 is provided in the GCU 30. The GCU 30 controls the energization of the glow plug 20 through PWM control. The switch 37 starts and stops the energization of the heating resistor 21 of the glow plug 20 in accordance with instructions from the microcomputer 31. Notably, in the present embodiment, in order to allow calculation of the resistance of the heating resistor 21, the switch 37 is composed of an FET having a current detection function (PROFET (registered trademark), product of Infineon Technologies AG), which is driven via an NPN-type transistor. Needless to say, an FET which does not have a current detection function may be used for the switch 37. In such a case, current flowing through a shunt resistor connected in series to the heating resistor 21 is calculated so as to detect the current. Alternatively, other well known methods may be used. For example, a resistor for current detection is connected in parallel to the switch 37 such that current flows through the resistor when the PWM control stops the supply of electricity, and the resistance of the heating resistor 21 is calculated directly from the divided voltage obtained from the resistor.

This GCU 30 is connected to an electronic control unit (ECU) 10 of the automobile via a CAN. The ECU 10 receives a measurement value from a water temperature sensor 5, which measures the temperature of cooling water of the engine 1. The GCU 30 can acquire the measured water temperature (water temperature information) from the ECU 10 via the CAN. In the present embodiment, the result of measurement by the water temperature sensor 5 (water temperature information), which is obtained via the ECU 10, is used as information regarding the environmental temperature, which will be described later. However, the embodiment may be modified such that the water temperature information can be obtained directly from the water temperature sensor 5. Further, the information regarding the environmental temperature is not limited to the water temperature information, and may be information regarding temperature which changes in accordance with the operation state of the engine 1, such as exhaust gas temperature, oil temperature, ambient temperature around the engine 1, and the temperature of the engine 1 itself. Notably, a signal for reporting the on/off state of the above-mentioned engine key 6 is also input to the ECU 10.

Next, the glow plug 20 will be described. The heat generation section of the glow plug 20 is composed of a heater 22 which uses, as a heating resistor 21, a heat generating coil formed of, for example, a Fe—Cr alloy or a Ni—Cr alloy, and which is held by a mounting metal piece 25 having a thread formed thereon for attachment to the engine 1. This heating resistor 21 has a positive correlation between temperature and resistance such that its resistance increases with its own temperature (in other words, the heating resistor 21 has a positive temperature coefficient of resistance). The glow plug may be of a type whose heat generation section is composed of a heater formed by embedding a heat generation wire (formed of a material having a high melting point, such as tungsten or molybdenum) into a base material formed of insulating ceramic, followed by firing. Any glow plug may be used so long as its heating resistor has a positive correlation between the temperature and resistance thereof. Notably, since the structure of the glow plug 20 is well known, its detailed description is not provided here.

One end of the heating resistor 21 is grounded via the mounting metal piece 25 and the engine 1, and the other end of the heating resistor 21 is connected to the battery 4 via the above-described switch 37. That is, the energization of the heating resistor 21 is effected through application of the voltage of the battery 4 to the heating resistor 21 by the PWM control. Further, the other end of the heating resistor 21 is connected to the microcomputer 31 via voltage division resistors 38 and 39 (which have resistances R1 and R2, respectively). Through this connection, the microcomputer 31 receives a voltage Ve, which is obtained through voltage division of the voltage Vg applied from the battery 4 to the heating resistor 21. The microcomputer 31 can obtain the voltage Vg applied to the glow plug 20 from a mathematical expression $Vg=\{(R1+R2)/R2\}\times Ve$. Since the current Ig flowing through the heating resistor 21 can be obtained from the switch 37 having a current detection function as described above, the microcomputer 31 can obtain the resistance Rg of the heating resistor 21 from a mathematical expression $Rg=Vg/Ig$. Notably, strictly speaking, the resistance Rg of the heating resistor 21 includes the wiring resistance inside the glow plug 20 and that of a path (e.g., electricity supply cable) for supplying electricity to the glow plug 20. In other words, the resistance obtained as the resistance Rg of the heating resistor 21 is the resistance of the entire wiring path including the heating resistor 21 (this resistance will be referred to as the "electricity supply resistance"). However, for the sake of convenience, these resistances will not be distinguished from each other, and, in the following description, the electricity supply resistance may be referred to as the resistance Rg of the heating resistor 21.

In the system configured as described above such that the GCU 30 controls the energization of the glow plug 20, in order to perform the energization control for the glow plug 20, the correlation between temperature and resistance of the heating resistor 21 is calibrated (corrected). The principle of the calibration will now be described briefly.

In the case where the heating resistor is free from an influence of disturbance or the like, upon application of a constant voltage to the heating resistor, a current flows through the heating resistor, so that the heating resistor generates heat. Since the resistance of the heating resistor increases with the temperature of the heating resistor, the current flowing through the heating resistor decreases gradually. Therefore, if the applied voltage is constant, the electric power supplied to the heating resistor decreases gradually with the temperature rise. That is, there can be obtained a curve which shows that the electric power decreases with elapse of time after the start of supply of electric power to the heating resistor.

At the beginning of supply of electric power, a relatively large current flows through the heating resistor, because the temperature of the heating resistor is low and the resistance thereof is small. As the temperature of the heating resistor increases, the increasing resistance thereof gradually reduces the current flowing through the heating resistor. In many cases, the temperature rise of the heating resistor occurs non-uniformly over the entire length, and, during the transition period of the temperature rise, the resistance increases in an instable manner. However, when the temperature distribution approaches an equilibrium state, the resistance becomes substantially constant, so that the temperature of the heating resistor becomes saturated.

Incidentally, the resistances of individual heating resistors vary due to various factors, and, due to the influence of the variation, even heating resistors of the same model number differ from one anther in the relation between temperature and resistance. However, the relation between the cumulative amount of supplied electric power (cumulative electric energy) and the amount of generated heat depends on the material of the heating resistors, and exhibits a relatively small variation among the heating resistors. Therefore, electricity is supplied to a heating resistor which serves as a reference until its temperature rise becomes saturated at a temperature which serves as a control target (target temperature), and the cumulative amount of electric power supplied up to that point in time (cumulative electric energy) is obtained. Through supply of this cumulative electric energy to a (different) heating resistor to be calibrated, the temperature of the heating resistor to be calibrated can be increased to the target temperature. Therefore, the resistance of the heating resistor (to be calibrated) at that time is obtained as an uncorrected resistance corresponding to the target resistance. When the PI control is performed such that the resistance of the heating resistor to be calibrated becomes the target resistance, the temperature of the heating resistor can be maintained at the target temperature.

However, as described above, the resistance of the heating resistor to be calibrated includes the wiring resistance inside the glow plug and that of a path for supplying electricity to the glow plug, and these resistances also change with the environmental temperature around the glow plug. According to the inventors, an environmental-temperature dependent correlation is known to be present between the resistance of the heating resistor at the start of supply of electricity thereto or the resistance at an arbitrary timing during the temperature rise and the resistance when the temperature becomes saturated (for details, see the specification of Japanese Patent Application No. 2008-142459). In view of the above, in the present embodiment, information regarding water temperature is acquired as information regarding the environmental temperature. Specifically, at the time of calibration, the uncorrected resistance of the heating resistor to be corrected is acquired, and the information regarding the water temperature at that time is also acquired. Subsequently, when temperature keeping energization (to be described later) is performed through the PI control in which the target resistance is used, the information regarding the water temperature at that time is acquired, and a correction table or a correction arithmetic expression previously determined on the basis of the above-mentioned correlation is applied thereto, whereby the uncorrected resistance is corrected on the basis of the water temperature so as to obtain the target resistance, on the basis of which the energization control of the glow plug is performed. As described above, the calibration is performed under the assumption that the resistance of the heating resistor includes the wiring resistance inside the glow plug and that of the path for supplying electricity to the glow plug. Therefore, the target resistance can be calculated accurately.

The GCU 30 is configured such that, when the GCU 30 detects that the glow plug 20 has been exchanged (removed from the engine 1), the GCU 30 performs the above-described calibration for a glow plug 20 newly attached to the engine 1. After that, every time the engine 1 is operated (the glow plug 20 is used), the GCU 30 applies the uncorrected resistance obtained through the calibration for the glow plug 20. In other words, the calibration for the glow plug 20 is not carried out every time the engine 1 is operated. Therefore, in the present embodiment, the GCU 30 performs not only control of the supply of electricity to the glow plug 20 in accordance with an energization control program to be described later, but also checking of exchange of the glow plug 20 (detecting or determining whether or not the glow plug 20 has been exchanged).

Incidentally, exchange of the glow plug 20 is performed when the engine 1 remains stopped, during which the microcomputer 31 of the GCU 30 remains in the above-mentioned power save mode so as to suppress consumption of electric power stored in the battery 4. In that power save mode, execution of various programs, including the energization control program, is stopped. In view of this, in the present embodiment, the microcomputer 31 is caused to move (return) from the power save mode to the normal mode upon receipt of the interruption signal periodically generated from the above-mentioned interruption timer 36. In the normal mode, the energization control program is executed, and the checking of exchange of the glow plug 20 is performed in the energization control program.

Figure 2:
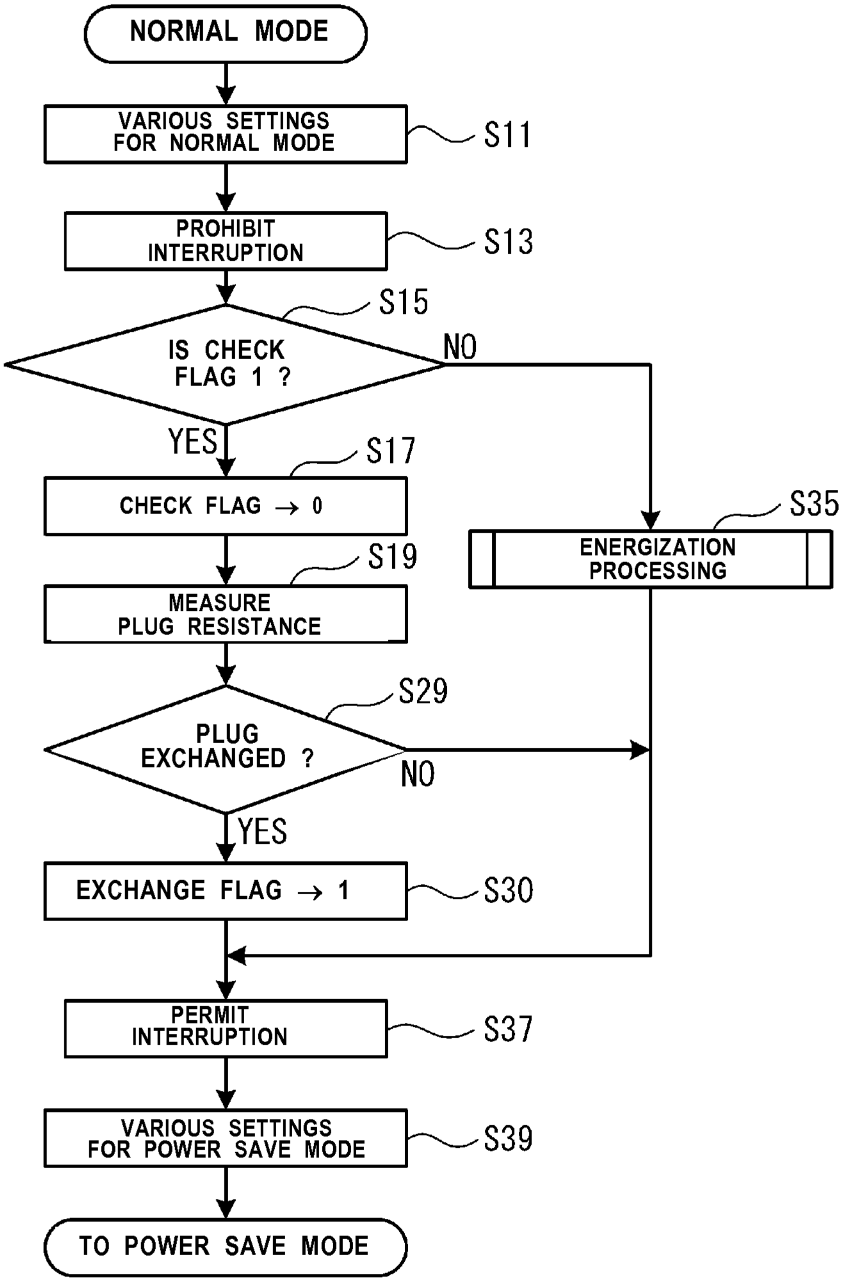
FIG. 2 Flowchart of a main routine of an energization control program executed by the GCU 30.
Figure 3:
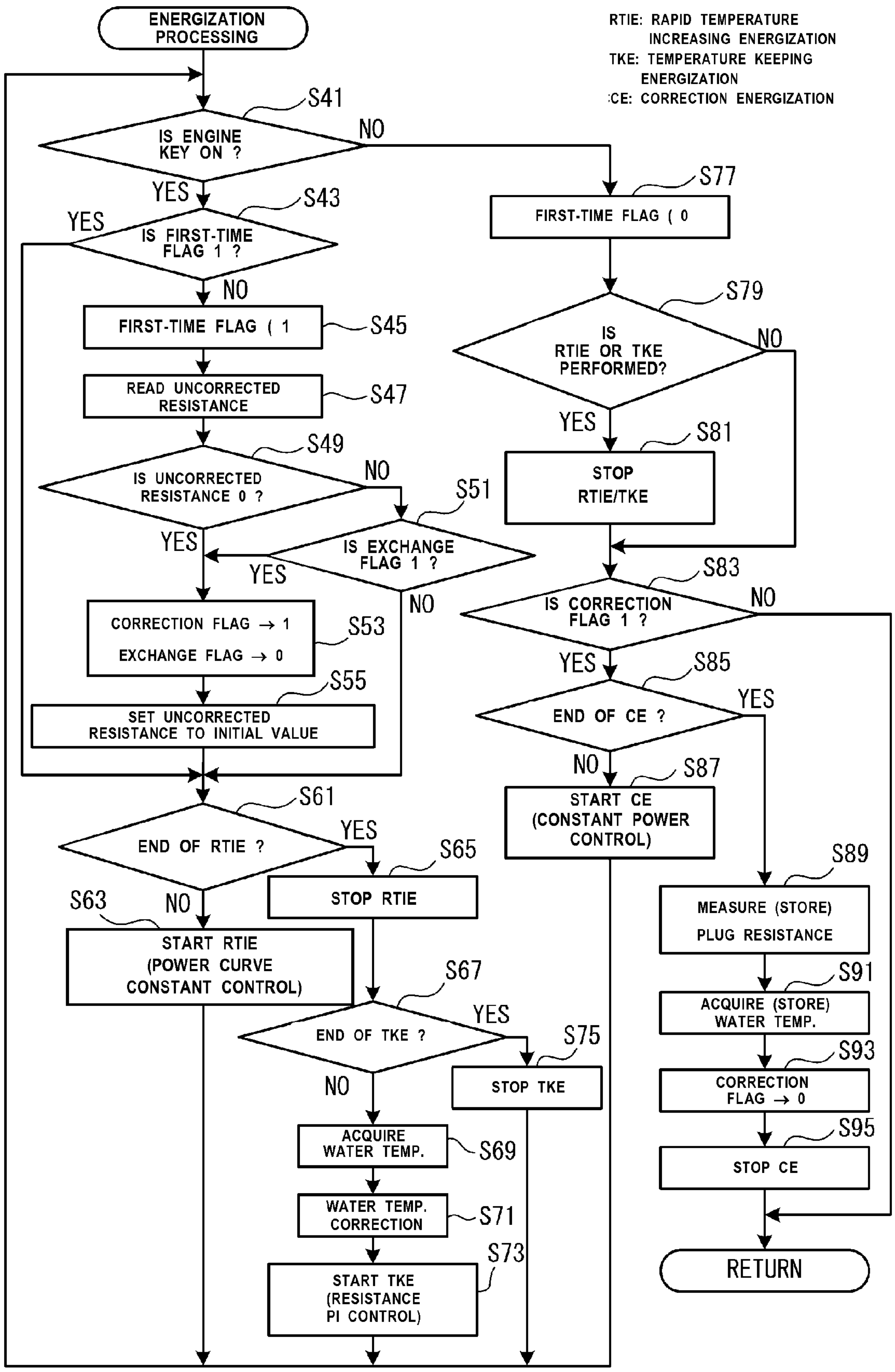
FIG. 3 Flowchart of energization processing which is called from the main routine of the energization control program.
Figure 4:
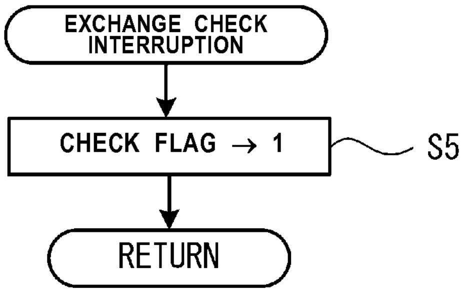
FIG. 4 Flowchart showing processing performed in response to exchange check interruption.

Next, a specific example of the energization control performed for the glow plug 20 by the GCU 30 will be described in accordance with flowcharts of the energization control program shown in FIGS. 2 to 4 and with reference to FIG. 1. FIG. 2 is a flowchart of a main routine of the energization control program executed by the GCU 30. FIG. 3 is a flowchart showing energization processing which is called from the main routine of the energization control program. FIG. 4 is a flowchart showing processing executed in response to exchange check interruption. Notably, each of steps of the flowcharts will be abbreviated to "S."

Before the description of the energization control, various variations and flags used in the energization control program will be described. Although the following flags and variables are stored in respective areas secured in the RAM 34, irrespective of the operation mode of the microcomputer 31, their values are maintained unless the CPU 32 is initialized.

A "check flag" is set to "1" when the checking of exchange of the glow plug 20 (exchange checking) is performed. Specifically, the check flag is set to "1" when the interruption signal is generated by the interruption timer 36. In the energization control program, when it is determined that the check flag has been set to "1," a series of processing steps for checking exchange of the glow plug 20 are performed.

A "first-time flag" is a condition determination flag used in the energization control program so as to execute specific processing steps (S45 to S55 to be described later) only when the engine key 6 is turned on first time. The specific processing steps are a portion of the series of processing steps which are repeatedly executed when the engine key 6 is on. The first-time flag is set to “1” when the engine key 6 is turned on and the specific processing steps are performed, and is set to “0” when the engine key 6 is turned off.

An “exchange flag” is a flag which is set to “1” when exchange of the glow plug 20 is detected in the series of processing steps for checking exchange of the glow plug 20. In the energization control program, when the exchange flag is set to “1,” a condition flag is set (a correction flag to be described later is set to “1”) so that the calibration for the glow plug 20 is executed.

A “correction flag” is a flag used for determining whether to perform the calibration. As described above, the calibration is performed when exchange of the glow plug 20 is detected. However, the calibration is also performed when the uncorrected resistance obtained through the calibration assumes a cleared value (i.e., 0). Although the uncorrected resistance is stored in the RAM 34, the stored uncorrected resistance disappears when the RAM 34 is cleared, for example, at the time of replacement of the battery 4 or at the time of shipment. In such a case as well, the correction flag is set to “1” in order to newly obtain the uncorrected resistance through performance of the calibration.

The “uncorrected resistance” is a resistance of the heating resistor 21 which is obtained through the calibration and which serves as a base for calculation of a resistance (target resistance) of the heating resistor 21 corresponding to a temperature (target temperature) at which the heating resistor 21 is to be maintained (kept). In the initial state (when the RAM 34 is cleared, for example, at the time of shipment or at the time of replacement of the battery 4, and the value of the uncorrected resistance is zero), a predetermined initial value is set to a storage area for the uncorrected resistance (this operation will be referred to as “setting the uncorrected resistance to its initial value”). Notably, the uncorrected resistance corresponds to the “first resistance” in the present invention.

The “target resistance” is a resistance of the heating resistor 21 which is obtained by correcting the uncorrected resistance on the basis of the information regarding the environmental temperature (e.g., the water temperature information), and which serves as a control target for maintaining the temperature of the heating resistor 21 at the target temperature.

[Operation at the Time of Normal Operation]

Next, the energization control for the glow plug 20 will be described in detail. First, there will be described the energization control which is performed for the glow plug 20 at the time of normal operation (in a state where the calibration has already been performed and the uncorrected resistance has been obtained). Notably, in this state, the values of the check flag, the first-time flag, the exchange flag, and the correction flag are all zero.

As described above, in the state where the operation of the engine 1 is stopped (the engine key 6 is off), the microcomputer 31 moves to the power save mode and waits for input of the interruption signal. The case where the interruption signal generated by the interruption timer 36 is input to the microcomputer 31 in this power save mode will be described later.

When a driver turns on the engine key 6 shown in FIG. 1, the interruption signal reporting that the engine key 6 is on is input to the microcomputer 31. In response thereto, the operation clock pulses for the microcomputer 31 are switched to those of a higher oscillation frequency for the normal mode, whereby the microcomputer 31 moves from the power save mode to the normal mode. Upon movement to the normal mode, the CPU 32 of the microcomputer 31 starts execution of the energization control program shown in FIG. 2 and performs various settings necessary for performing the energization control for the glow plug 20 in the normal mode (S11). Further, the CPU 32 performs processing for prohibiting interruption (S13), whereby interruption signals input to the microcomputer 31 are ignored after that.

Next, the CPU 32 refers to the check flag. Since the checking of exchange of the glow plug 20 is not performed in the normal operation and the value of the check flag is “0” (S15: NO), the CPU 32 proceeds to S35, and calls the subroutine of energization processing shown in FIG. 3. As shown in FIG. 3, in the energization processing, the CPU 32 determines whether or not the engine key 6 is on, on the basis of the voltage of a port of the microcomputer 31 connected to the engine key 6. Since the engine key 6 has been turned on as described above (S41: YES), the CPU 32 proceeds to S43. Notably, in a period during which the engine key 6 is on (S41: YES), through repeated execution of S43 to S75, the state of energization of the glow plug 20 (rapid temperature increasing energization and temperature keeping energization which will be described later) is controlled.

At the time of first execution of the energization processing after the CPU 32 returns to the normal mode, the first-time flag is in the initial state (i.e., “0”) as in the case of the above-mentioned check flag (S43: NO). Since the first-time flag is a flag for executing S45 to S55 only one time after the CPU 32 returns to the normal mode, the first-time flag is set to “1” in S45 so as to jump from S43 to S61 in the next and subsequent executions of the energization processing.

In S47, the CPU 32 reads the uncorrected resistance (refers to the value thereof) (S47). As described above, the uncorrected resistance is stored in the RAM 34 when the calibration is performed. When the uncorrected resistance is not 0 (S49: NO), it means that the calibration has already been executed (here, the description is continued under the assumption that the uncorrected resistance has already been obtained), and the CPU 32 next refers to the exchange flag (S51). Since the exchange flag is set to “1” when exchange of the glow plug 20 has been detected (which will be described later), the value of the exchange flag is “0” at the present point in time (S51: NO), and the CPU 32 proceeds to S61.

In S61 to S75, the CPU 32 performs the energization processing for the glow plug 20. Before the temperature of the heating resistor 21 reaches the temperature increasing target temperature after the supply of electricity to the heating resistor 21 is started (S61: NO), the CPU 32 performs energization (rapid temperature increasing energization) for quickly elevating the temperature of the heating resistor 21 (S63). Notably, the temperature increasing target temperature is a temperature which is slightly lower than the temperature (target temperature) of the heating resistor 21 corresponding to the target resistance and which serves as a temperature increasing target set such that the temperature of the heating resistor 21 can reach the target temperature through supply of a small amount of electricity to the heating resistor 21 after the control is switched from constant power control to resistance control.

In this rapid temperature increasing energization, the supply of electricity to the heating resistor 21 is controlled such that a curve which represents the relation between the electric power supplied to the heating resistor 21 and elapse of time coincides with a previously made reference curve, whereby the temperature of the heating resistor 21 can be increased quickly (e.g., 2 seconds) to the temperature increasing target temperature irrespective of the properties of the heating resistor 21. Specifically, the CPU 32 obtains the value of electric power to be supplied at each point in time after the start of energization, by making use of a predetermined relational expression or table which represents the above-mentioned reference curve. From the relation between the magnitude of current flowing through the heating resistor 21 and the value of electric power to be supplied at that point in time, the CPU 32 obtains a voltage to be applied to the heating resistor 21, and controls the voltage applied to the heating resistor 21 by means of PWM control. As a result, the supply of electric power is performed to follow the reference curve, whereby the heating resistor 21 generates heat in accordance with the cumulative amount of electric power supplied up to each point of the temperature increasing process. Therefore, upon completion of the supply of electric power to follow the above-mentioned reference curve, the heating resistor 21 reaches the temperature increasing target temperature at a point in time determined by the reference curve.

After that, the CPU 32 returns to S41, and repeats the processing of S63 until the rapid temperature increasing energization ends, to thereby continue the rapid temperature increasing energization of the heating resistor 21 (S41: YES, S43: YES, S61: NO, S63). Notably, since the first-time flag has been set to "1" in S45, in the second or subsequent executions of the present processing, the CPU 32 proceeds to from S43 to S61 (S43: YES).

As described above, in the transition period of the rapid temperature increasing energization, the electric power supplied to the heating resistor 21 is adjusted such that the temperature of the heating resistor 21 reaches the temperature increasing target temperature. Notably, in the present embodiment, the rapid temperature increasing energization is ended when one of the following two conditions is satisfied. The first condition is satisfied when a predetermined time (e.g., 3.3 sec) has elapsed after the start of the rapid temperature increasing energization of the heating resistor 21. In this case, the temperature of the heating resistor 21 has reached the temperature increasing target temperature. The second condition is satisfied when the resistance Rg of the heating resistor 21 has become a predetermined resistance (e.g., 780 mΩ). In the case where the temperature of the heating resistor 21 is already somewhat high at the time when the supply of electric power to the heating resistor 21 is started (for example, in the case where the heating resistor 21 is energized again without being cooled sufficiently after the previous energization ends), the supply of electric power is stopped when the resistance Rg of the heating resistor 21 reaches the predetermined resistance. Therefore, excessive temperature rise of the heating resistor 21 can be prevented.

When the CPU 32 determines that the rapid temperature increasing energization must be ended; i.e., that either of the above-described conditions is satisfied in the period in which the rapid temperature increasing energization is continued through repetition of S41 to S63 (S61: YES), the CPU 32 stops the supply of electric power to the heating resistor 21 by means of the PWM control (S65). In the present embodiment, after the rapid temperature increasing energization, the CPU 32 performs temperature keeping energization (so-called after glow energization) so as to maintain the temperature of the heating resistor 21 at the target temperature corresponding to the target resistance to thereby enhance the operation stability of the engine 1 after the startup thereof. This temperature keeping energization is determined to end when a predetermined period of time (e.g., 180 sec) elapses. Therefore, clocking by an unillustrated timer is started simultaneously with the start of the temperature keeping energization. Before elapse of the predetermined period of time (S67: NO), for the temperature keeping energization, the CPU 32 acquires the water temperature information from the water temperature sensor 5 via the ECU 10 (S69). The CPU 32 performs the above-described water temperature correction for the uncorrected resistance stored in the RAM 34 on the basis of the water temperature information, to thereby obtain the target resistance (S71). Then, the CPU 32 performs the temperature keeping energization of the heating resistor 21 through PI control in which the duty ratio is changed in accordance with the difference between the resistance Rg of the heating resistor 21 and the target resistance such that the resistance Rg of the heating resistor 21 approaches the target resistance (S73). After that, the CPU 32 returns to S41, and repeats the processing of S73 until the temperature keeping energization ends, to thereby continue the temperature keeping energization of the heating resistor 21 (S41: YES, S43: YES, S61: YES, S67: NO, S73). Notably, the CPU 32, which performs water temperature correction for (applies a predetermined correction table or correction arithmetic expression to) the uncorrected resistance in S71 to thereby obtain the target resistance, corresponds to the "second computation means" in the present invention. Further, the CPU 32, which controls the temperature keeping energization of the heating resistor 21 by means of PI control in S73, corresponds to the "energization control means" in the present invention.

When the CPU 32 determines that the temperature keeping energization must be ended; i.e., that the predetermined time (180 sec) has elapsed in the period in which the temperature keeping energization is continued through repetition of S41 to S73 (S67: YES), the CPU 32 stops the supply of electricity to the heating resistor 21 (S75). After that, the CPU 32 does not supply electricity to the glow plug 20 while the engine key 6 is on (S41: YES, S43: YES, S61: YES, S67: YES).

When the driver turns the engine key 6 off so as to stop the operation of the engine 1 (S41: NO), the CPU 32 resets the first-time flag (S77) so that the processing of S45 to S55 is performed when the engine 1 is operated next time. If the rapid temperature increasing energization or the temperature keeping energization of the glow plug 20 is being performed when the engine key 6 is turned off (S79: YES), the CPU 32 stops the energization (S81). If not (S79: NO), the CPU 32 proceeds directly to S83. In S83, the CPU 32 refers to the correction flag. Since the calibration has already been performed before the normal operation is performed, the value of the correction flag is "0" (S83: NO). Therefore, the CPU 32 returns to the main routine.

As shown in FIG. 2, when the energization processing of S35 ends, the CPU 32 permits interruption (S37), so that the CPU 32 again becomes possible to accept an interruption signal input to the microcomputer 31. After performing various settings necessary for movement to the power save mode (S39), the operation clock pulses of the microcomputer 31 are switched to those of a low oscillation frequency for the power save mode, whereby the microcomputer 31 moves from the normal mode to the power save mode. As a result, the energization control program is stopped.

[Operation at the Time of Exchange Checking]

Next, there will be described a series of operation steps for checking exchange of the glow plug 20. The checking for determining whether or not the glow plug 20 mounted to the engine 1 has been exchanged is periodically performed when the engine 1 is not operated; i.e., when the microcomputer 31 is in the power save mode. In the present embodiment, exchange of the glow plug 20 is checked at intervals of 60 seconds, and the intervals (a time required for exchange of the glow plug 20) are set to be shorter than a time actually required to remove an old glow plug 20 from the engine 1 and then attach a new glow plug 20 to the engine 1. That is, the above-mentioned intervals are set such that, when the glow plug 20 is exchanged, the checking of exchange of the glow plug 20 is performed at least one time in the period in which the glow plug 20 is removed from the engine 1.

In the case where the microcomputer 31 is in the power save mode, when the interruption signal generated from the interruption timer 36 at the above-described time intervals (60 sec) is input to the CPU 32, the interruption signal is accepted, and the microcomputer 31 moves to the normal mode. When the interruption signal is input from the interruption timer 36, the CPU 32 executes a program for exchange check interruption processing shown in FIG. 4, whereby the check flag is set to "1" (S5). As a result, when the energization control program shown in FIG. 2 is executed, the CPU 32 determines in S15 that the check flag has been set to "1" (S15: YES), and performs a series of processing steps (S17 to S30) for checking exchange of the glow plug 20.

First, after resetting the check flag (S17), the CPU 32 instantaneously supplies electricity to the heating resistor 21 for a short period of time, and calculates (acquires) the resistance Rg of the heating resistor 21 from the voltage Vg applied to the heating resistor 21 at that time and the current Ig flowing through the heating resistor 21 at that time (S19). No limitation is imposed on the cumulative amount of electric power (electric energy) supplied to the heating resistor 21, so long as the electric energy falls within a range in which the temperature of the heating resistor 21 having risen as a result of the energization drops to the temperature of the heating resistor 21 before the energization due to natural heat radiation in the period between two interruption signals successively output from the interruption timer 36 (that is, in the period in which the heating resistor 21 is not energized). In order to accurately obtain the resistance Rg of the heating resistor 21, it is necessary to supply an electric energy equal to or greater than a predetermined electric energy to thereby stabilize the current Ig flowing through the heating resistor 21. However, S19 is executed when the engine 1 is not operated, and the energy stored in the battery 4 is consumed. Therefore, it is desired to suppress the cumulative amount of the supplied electric power (i.e., the supplied electric energy) to fall with the above-described range, rather than supplying electric power limitlessly, to thereby reduce the power consumption.

Since the resistance of the heating resistor 21 increases with its temperature rise, in order to accurately calculate the resistance Rg, it is preferred to reduce the degree of the temperature rise of the heating resistor 21 caused by the energization. Therefore, instantaneous supply of electricity to the heating resistor 21 is further preferred. Specifically, in the present embodiment, the resistance Rg is accurately calculated from the value of the current Ig obtained through instantaneous supply of electricity to the heating resistor 21 over about 25 msec. For example, in the case of the heating resistor 21 according to the present invention whose temperature can be elevated to 1000° C. or higher within about 2 sec, the temperature rise caused by the instantaneous supply of electricity over about 25 msec is very small as compared with 1000° C. Therefore, it can be said that the instantaneous supply of electricity hardly changes the temperature of the heating resistor 21. Accordingly, the influence of the temperature rise of the heating resistor 21 on the resistance Rg thereof is very small, and hardly produces an error. Even when the temperature of the heating resistor 21 increases due to such instantaneous supply of electricity, the temperature of the heating resistor 21 can be lowered sufficiently to the temperature before the supply of electricity within 60 sec, which is the intervals of the interruption signals output from the interruption timer 36. Further, when electricity is supplied to the heating resistor 21 for a period of time longer than 25 msec, the current Ig becomes more stable, so that the calculation accuracy of the resistance Rg is improved. Even when the electricity is supplied to the heating resistor 21 for 50 msec, the degree of the temperature rise caused by the instantaneous supply of electricity is still very small as compared with 1000° C. In addition, in order to suppress power consumption, it is desired to render the cumulative amount of the supplied electric power equal to that in the above-described case where the electricity is supplied to the heating resistor 21 for 25 msec. Therefore, in the case where electricity is supplied to the heating resistor 21 for 50 msec in order to calculate the resistance Rg, the intervals of the interruption signals generated from the interruption timer 36 is desirably set to 120 sec.

The resistance Rg of the heating resistor 21 is compared with a predetermined threshold value (first reference value). In the case where the glow plug 20 is removed from the engine 1, since the heating resistor 21 is not present, the current Ig does not flow, so that the electricity supply resistance associated with the supply of electricity to the heating resistor 21 becomes very large. Therefore, when the resistance Rg of the heating resistor 21 is larger than the first reference value, the CPU 32 determines that the glow plug 20 has been removed; i.e., the glow plug 20 has been exchanged (S29: YES), and sets the exchange flag to "1" (S30). In contrast, when the resistance Rg is not greater than the first reference value (S29: NO), the CPU 32 determined that the glow plug 20 has not been exchanged. After that, the CPU 32 performs the processing of the above-described S37 and subsequent steps, and then move to the power save mode. As described above, the checking of exchange of the glow plug 20 is periodically performed in the power save mode, and, when exchange of the glow plug 20 is detected, the exchange flag is set to "1." Notably, the CPU 32, which determines in S29 whether or not the glow plug 20 has been exchanged, corresponds to the "determination means" in the present invention. Further, the CPU 32, which acquires the resistance Rg of the heating resistor 21 in S19, corresponds to the "first resistance acquisition means" in the present invention, and the resistance Rg acquired at that time corresponds to the "first resistance" in the present invention.

[Operation at the Time of Calibration]

Next, there will be described an operation for performing calibration for the heating resistor 21 of the glow plug 20. As described above, the calibration for the glow plug 20 is performed when exchange of the glow plug 20 is detected (the exchange flag is set to "1") or when the uncorrected resistance assumes a cleared value (i.e., 0). In order to avoid influences of disturbances such as cooling by swirl or fuel, the calibration is performed when the engine 1 is not operated. Further, since in the calibration the heating resistor 21 is heated to a temperature approximately equal to a temperature to which the heating resistor 21 is heated at the time of startup of the engine 1, a large amount of electric power is consumed. Therefore, in the case where exchange of the glow plug 20 is detected when the microcomputer 31 is in the power save mode, the calibration is performed when the engine 1 is operated next time and then stopped (that is, when the battery 4 is expected to have been charged).

Therefore, when the engine key 6 is turned on so as to operate the engine 1, after having returned to the normal mode, the CPU 32 performs, as shown in FIG. 3, the energization control for the glow plug 20 as usual (S41 to S75). As in the above-described case, when the processing of S41 to S75 is first performed after the engine key 6 has been turned on, the value of the first-time flag is 0 (S43: NO). Therefore, the CPU 32 executes S45 to S55. At that time, if the value of the exchange flag is "1" (S51: YES) or the uncorrected resistance assumes the cleared value (S49: YES), the CPU 32 sets the correction flag to "1" and rests the exchange flag to "0" (S53). Further, since the uncorrected resistance stored in the RAM 34 at this point in time is that of the heating resistor 21 of the glow plug 20 before being exchanged, the CPU 32 sets the uncorrected resistance to its initial value (S55), and then performs the above-described energization processing for the glow plug 20 (S61 to S75). Notably, the initial value of the uncorrected resistance is previously determined such that, even when a target resistance calculated from the initial value is used to control the resistances of other heating resistors of different properties, none of the heating resistors suffer excessive temperature increase. Notably, the CPU 32, which sets the uncorrected resistance to its initial value, corresponds to the "second setting means" in the present invention.

As described above, when the engine key 6 is first turned on so as to operate the engine 1 after the glow plug 20 is exchanged or the uncorrected resistance is cleared (at the time of shipment of the automobile or at the time of exchange of the battery 4), the energization control for the glow plug 20 is performed as usual. When the engine key 6 is turned off (S41: NO), since the value of the correction flag "1" this time, the CPU 32 proceeds from S83 to S85 so as to perform the calibration (S83: YES).

As described above, in the calibration, the cumulative amount of electric power (cumulative electric energy) for obtaining the target temperature is supplied to the heating resistor 21, and, when the temperature rise of the heating resistor 21 becomes saturated and its temperature becomes stable at the target temperature, the resistance Rg is acquired as the uncorrected resistance. In the present embodiment, the temperature rise of the heating resistor 21 is determined to have become saturated when a predetermined period of time (e.g., 60 sec) has elapsed after the start of the calibration. Therefore, the CPU 32 starts an unillustrated timer simultaneously with the start of the calibration, and, until the period of time required for saturation of the temperature rise elapses (S85: NO), the CPU 32 performs the correction energization; i.e., supplies a constant amount of electric power per unit time to the heating resistor 21 such that the ultimate cumulative amount of the supplied electric power (cumulative electric energy) becomes equal to the target cumulative electric energy (S87). After that, the CPU 32 returns to S41, and continues the correction energization.

When, while the processing is repeated (S41: NO, S83: YES, S85: NO, S87), 60 sec (the time within which the temperature rise of the heating resistor 21 is considered to have become saturated) elapses after the start of the correction energization (S85: YES), the CPU 32 proceeds to S89. Since the temperature of the heating resistor 21 has reached the target temperature, the CPU 32 obtains the resistance Rg of the heating resistor 21 at that time, and stores it in the RAM 34 as the uncorrected resistance (S89). Further, the CPU 32 acquires the water temperature information from the water temperature sensor 5 via the ECU 10, and sores it in the RAM 34 along with the uncorrected resistance (S91). Subsequently, the CPU 32 resets the correction flag so as to memorize the completion of the calibration (S93), and stops the supply of electricity to the heating resistor 21 to thereby end the correction energization (S95). After that, the CPU 32 returns to the main routine of FIG. 2. Notably, the CPU 32, which performs the correction energization in S87 so as to supply to the heating resistor 21 the cumulative amount of electric power (cumulative electric energy) for reaching the target temperature and then obtains the uncorrected resistance in S89, corresponds to the "second resistance acquisition means" in the present invention. Further, the CPU 32, which acquires the water temperature information from the water temperature sensor 5 via the ECU 10 in S91, corresponds to the "second information acquisition means" in the present invention.

When the CPU 32 returns to the main routine shown in FIG. 2, the CPU 32 permits interruption by performing the above-described processing of S37, performs various setting in S39, and moves to the power save mode. As a result, the energization control program is stopped. Notably, in the case where the engine key 6 is turned on in the middle of the calibration (in the middle of the above-described correction energization), the CPU 32 performs the rapid temperature increasing energization and the temperature keeping energization. However, since the calibration has not yet been completed, the uncorrected resistance has not yet been acquired. Therefore, the CPU 32 sets the uncorrected resistance to its initial value, and performs the energization control for the glow plug 20. Therefore, when the engine key 6 is turned off later on, the CPU 32 performs the calibration again.

Notably, needless to say, the prevent invention is not limited to the above-described embodiment, and various modifications are possible. For example, the determination as to whether or not the glow plug 20 has been exchanged can be made on the basis of a change in the resistance of the heating resistor 21 caused by deterioration thereof with time. As described above, the resistance of the heating resistor 21 changes due to the deterioration with time. The change in the resistance caused by the deterioration with time tends to increase gradually although a large change does not occur until the deterioration progresses to a certain degree. Therefore, when the old glow plug 20 is exchanged with a new glow plug 20, the resistance Rg of the new heating resistor 21 is lower than the resistance Rg of the old heating resistor 21. In a first modification which will be described below, the resistance Rg of the heating resistor 21 acquired at the time of checking of exchange of the glow plug 20 is memorized (stored); and the determination as to whether or not the glow plug 20 has been exchanged is performed on the basis of the result of comparison between the latest (current) resistance of the heating resistor 21 and the stored previous (past) resistance of the heating resistor 21 (more specifically, the water temperature correction is also performed). The first modification will be described specifically with reference to FIG. 5. The first modification of the energization control program shown in FIG. 5 differs from the energization control program shown FIG. 2 in that additional processing steps for obtaining change in the resistance of the heating resistor 21 are inserted between S19 and S29 and between S30 and S37 of the energization control program shown FIG. 2. Notably, the descriptions of processing steps identical with those of the above-described embodiment (which are denoted by like step numbers) will be omitted or simplified.

Figure 5:
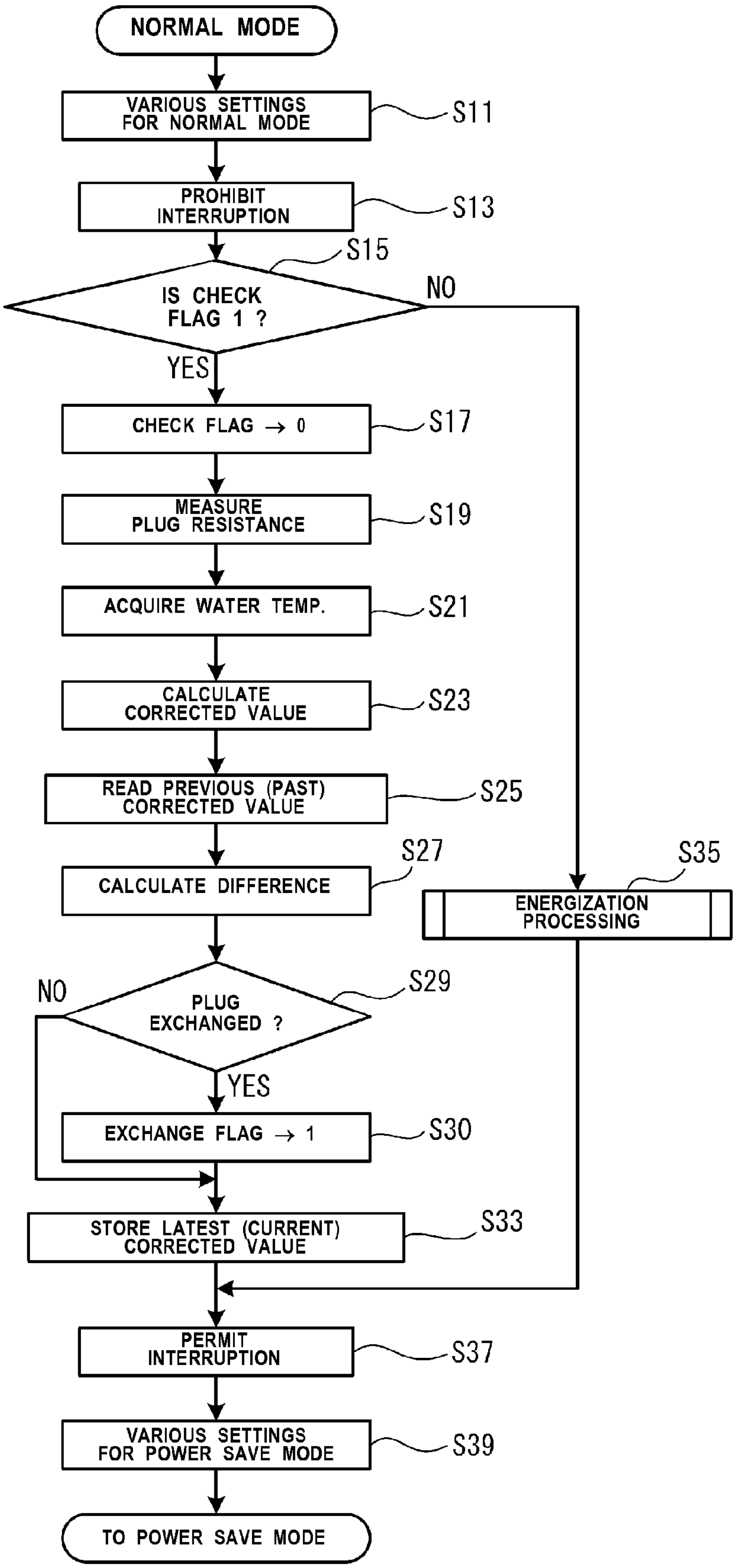
FIG. 5 Flowchart of an energization control program according to a first modification.

As described above, when the engine key 6 is not turned on in the power save mode, in response to the interruption signal generated by the interruption timer 36 every 60 sec, the microcomputer 31 enters the normal mode. When the interruption signal is generated by the interruption timer 36, the check flag is set to "1." Therefore, as shown in FIG. 5, the CPU 32 executes the processing of S17 to S33 in the normal mode (S15: YES). The CPU 32 resets the check flag in S17, and calculates (acquires) the latest (current) resistance Rg of the heating resistor 21 from the voltage Vg and the current Ig in S19. Further, the CPU 32 acquires the water temperature information from the ECU 10 as the environmental temperature (S21). The CPU 32 then corrects the resistance Rg of the heating resistor 21 acquired this time by use of the water temperature information, to thereby obtain a corrected value for comparison under the same conditions (S23). Notably, the CPU 32, which acquires, as the information regarding the environmental temperature, the water temperature information from the water temperature sensor via the ECU 10 in S21, corresponds to the "first information acquisition means" in the present invention. Also, the CPU 32, which calculates the corrected value in S23, corresponds to the "correction means" in the present invention.

Next, the CPU 32 reads the previous (past) corrected value stored in the RAM 34 (S25), and calculates a difference between the previous (past) corrected value and the latest (current) corrected value obtained in S23 (S27). Notably, the past corrected value is prepared as follows. The corrected value obtained in S23 during the previous execution of the processing of S17 to S33 is memorized (stored) in a predetermined storage area (first area) of the RAM 34 in S33 to be described later, and the stored corrected value is used as the past corrected value in S25 during the current execution of the processing of S17 to S33. Notably, the CPU 32, which calculates the difference in S27, corresponds to the "first computation means" in the present invention.

In S29 subsequent to S27, the CPU 32 determines, on the basis of the difference, whether or not the glow plug 20 has been exchanged. For example, in the case where the resistance Rg of the heating resistor 21 increases gradually due to deterioration with time, the difference obtained by subtracting the latest corrected value from the previous corrected value assumes a negative value. Therefore, if the difference is greater than a predetermined threshold value (second reference value), the CPU 32 determines that the glow plug 20 has been exchanged (S29: YES). In this case, the CPU 32 sets the exchange flag to "1" so that the calibration is executed (S30). Notably, the second reference value is provided so as to tolerate measurement errors. After the exchange determination processing of S29 and S30, the CPU 32 overwrites the previous (past) corrected value stored in the first area of the RAM 34 with the latest (current) corrected value calculated in S23 to thereby store the latest (current) corrected value (S33). Therefore, the CPU 32 uses the latest corrected value as the past corrected value at the time of next exchange determination. The CPU 32 then proceeds to S37 to perform the same procedure in S37 and subsequent steps as that in the above-described embodiment. Notably, the RAM 34, which stores the corrected value in S33" corresponds to the "storage means" in the present invention.

The above-described second reference value may be properly set on the basis of the degree of change in the corrected value (obtained from the resistance Rg) caused by deterioration of the heating resistor 21 with time. Further, as described above, the resistance of the heating resistor 21 gradually increases due to the deterioration with time. Therefore, when a lower-limit reference value is provided for the difference, the exchange flag can also be set to "1" when the deterioration progresses greatly. In other words, the glow plug 20 can be considered not having been exchanged when the difference, which reflects a change between the previous (past) resistance Rg of the heating resistor 21 and the latest (current) resistance Rg thereof, falls within a range between the upper-limit reference value (second reference value) and the lower-limit reference value.

Notably, in the above-described first modification, the exchange determination is performed on the basis of the difference between the corrected values calculated during two consecutive operations of checking the exchange of the glow plug 20. However, the acquisition of the corrected value is not necessarily required to be performed during two consecutive operations of checking the exchange of the glow plug 20, and the acquisition may be performed every time exchange of the glow plug 20 is checked several times, and may be performed discontinuously or irregularly. Since the determination as to whether or not the glow plug 20 has been exchanged is made by determining whether or not a large change occurs between the previous (past) resistance Rg of the heating resistor 21 and the latest (current) resistance Rg thereof, the checking of exchange of the glow plug 20 is not necessarily required to be performed when the glow plug 20 is removed. However, since the change in the resistance Rg of the heating resistor 21 caused by the deterioration with time is expected to increase as the acquisition interval between the previous and latest corrected values increases, the acquisition of the corrected value is desirably performed at periodic short intervals (which correspond to, for example, a time required for exchange of the glow plug 20) as in the present embodiment.

Further, in the first modification, the corrected value is obtained in S23 on the basis of the water temperature information acquired in S21. However, in the case where the determination as to where or not the exchange has been performed is made only when the water temperature information acquired in S21 indicates that the temperature of cooling water coincides with a predetermined water temperature or falls within a predetermined water temperature range, the determination as to where or not the exchange has been performed can be made on the basis of the acquired resistance of the heating resistor 21 having undergone only the correction performed in accordance with the properties of the heating resistor 21 (that is, with the correction based on the water temperature information omitted).

Figure 6:
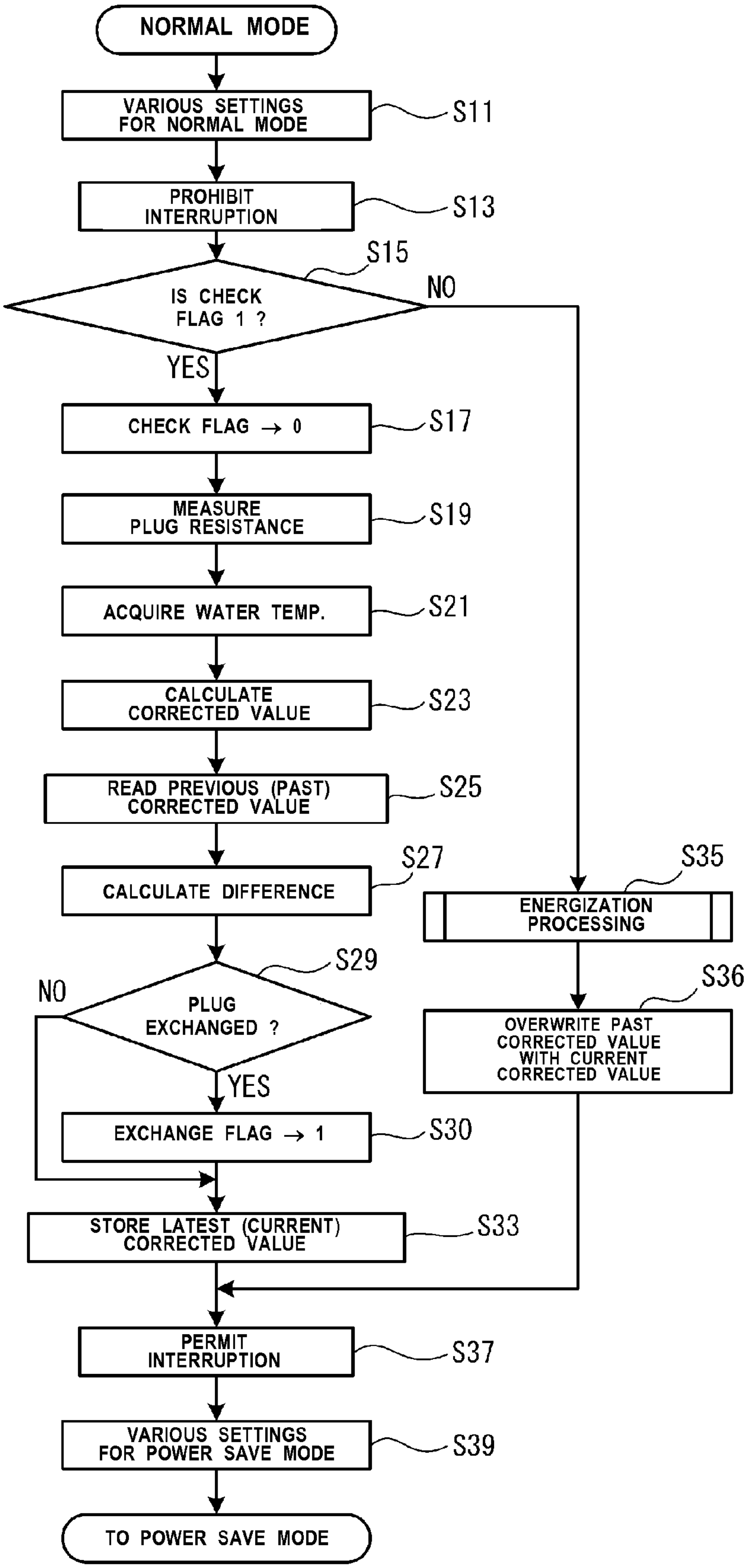
FIG. 6 Flowchart of an energization control program according to a second modification.

Further, as in a second modification shown in FIG. 6, the above-described embodiment may be modified as follows. That is, an area (second area) for storing the current corrected value and an area (first area) for storing the past corrected value are secured in the RAM 34. The corrected value obtained in the power save mode after the previous operation of the engine 1 is used as the past corrected value, and the corrected value obtained in the power save mode after the latest operation of the engine 1 is used as the current corrected value. The difference between these corrected values is obtained. Specifically, the second modification shown in FIG. 6 is identical with the first modification except that a processing step for storing, through overwriting, the current corrected value (stored in the second area) in the first area (S36) is added between S35 (energization processing) and S37. Further, in S25, the past corrected value is read from the first area, and, in S33, the current corrected value is stored in the second area through overwriting.

With this operation, the corrected value acquired each time the exchange checking is performed is stored in the second area through overwriting and is always updated to the newest value during a period between a point in time at which the engine 1 is stopped this time and a point in time at which the engine is operated next time (for the sake of convenience, hereinafter referred to as the latest "exchange checking timing"). Meanwhile, the past corrected value stored in the first area is the latest corrected value acquired at the previous exchange checking timing, and is not updated until the engine 1 is operated and stopped next time after the engine 1 is operated and stopped this time (that is, after the energization processing is performed in S35). Therefore, the difference for determining whether or the glow plug 20 has been exchanged can be obtained from the current corrected value which is updated each time the exchange checking is performed at the latest exchange checking timing and the past corrected value acquired at the previous exchange checking timing. Therefore, for the determination as to whether the glow plug 20 has been exchanged, which determination is performed on the basis of a change in the resistance of the heating resistor 21 caused by the deterioration with time, the difference value is calculated from the current and past corrected values obtained before and after a period in which the engine 1 is operated and stopped one time (i.e., the glow plug 20 is used one time). Therefore, the determination as to whether or not the glow plug 20 has been exchanged can be performed more accurately. Needless to say, the difference may be calculated from the current and past corrected values obtained before and after a period in which the engine 1 is operated and stopped a plurality of times.

Further, in case of the above-described first and second modifications, when the RAM 34 is cleared, for example, at the time of replacement of the battery 4 or at the time of shipment, respective initial values may be stored in the corrected value storage areas (first and second areas) of the RAM 34. Alternatively, these storage areas may be left in the cleared state in which zero is stored in these storage areas. In this case, the determination on exchange of the glow plug 20 in S29 is preferably performed such that, when the initial values or zero are stored in the first and second areas, the glow plug 20 is determined to have been exchanged, irrespective of the difference. This operation makes it possible to perform the calibration at the time of replacement of the battery 4 or at the time of shipment. When the determination on exchange of the glow plug 20 in the first modification or the second modification may be performed along with the determination on exchange of the glow plug 20 in the above-described embodiment, the determination on exchange of the glow plug 20 can be performed more accurately.

Figure 7:
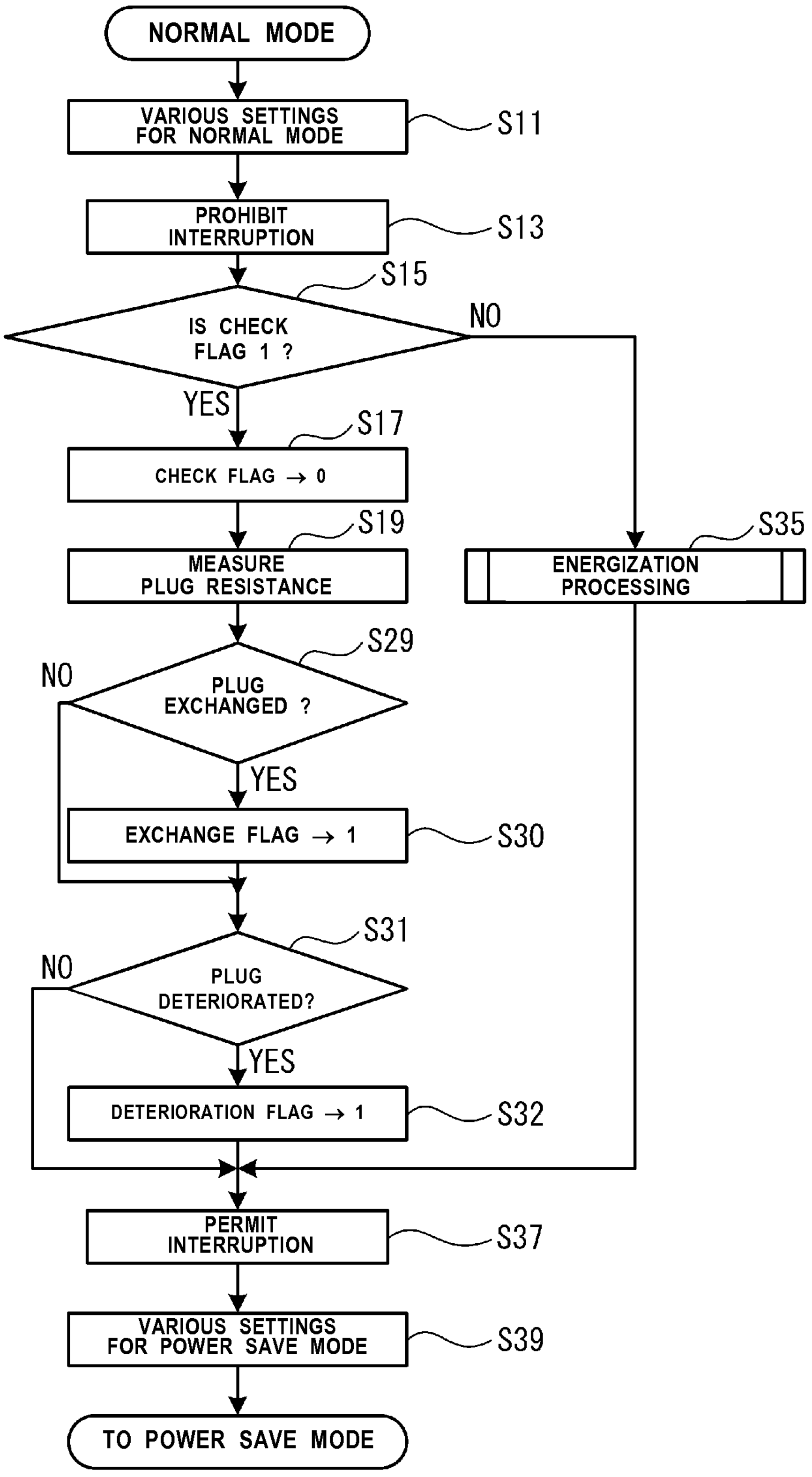
FIG. 7 Flowchart of an energization control program according to a third modification.

Further, as in the case of a third modification of the energization control program shown in FIG. 7, the above-described embodiment may be modified to detect deterioration of the heating resistor 21. The third modification of the energization control program shown in FIG. 7 is such that an additional processing step of detecting deterioration of the heating resistor 21 is added between S30 and S37 of the energization control program of FIG. 2. Further, FIG. 8 shows a modification of the energization processing shown in FIG. 3 in which a processing step to be performed upon detection of deterioration is added between S55 and S61 of the energization processing of FIG. 3.

In the third modification, deterioration of the heating resistor 21 is detected by means of observing a change in the electricity supply resistance associated with the supply of electricity to the heating resistor 21. The resistance of the heating resistor 21, for example, at room temperature increases as the deterioration thereof proceeds. However, the heating resistor 21 is known to have properties such that its resistance increases sharply when the deterioration progresses to a certain degree, rather than increasing gradually with the progress of the deterioration. Therefore, the CPU 32 detects deterioration of the heating resistor 21 in a manner as shown in FIG. 7. That is, when the resistance Rg of the heating resistor 21 obtained in S17 is higher than a predetermined deterioration determination value, the CPU 32 determines that the heating resistor 21 has deteriorated (S31: YES), and sets a deterioration flag (a flag showing the result of determination as to whether or not the heating resistor 21 has deteriorated) to “1” (S32), and then proceeds to S37. When the resistance Rg is equal to or less than the deterioration determination value (S31: NO), the CPU 32 proceeds directly to S37. However, as described above, if the resistance Rg of the heating resistor 21 is greater than the first reference value, the CPU 32 determines in S29 that the glow plug 20 has been exchanged. Although the detection of deterioration of the heating resistor 21 is performed after the checking of exchange of the glow plug 20, in S31, the condition that the resistance Rg is equal to or less than the first reference value is also used as a condition for the deterioration detection. After completion of the above-described deterioration detection processing of S31 and S32, the CPU 32 proceeds to S37. Notably, the CPU 32, which determines in S31 that the heating resistor 21 has deteriorated, corresponds to the “deterioration detection means” in the present invention.

Figure 8:
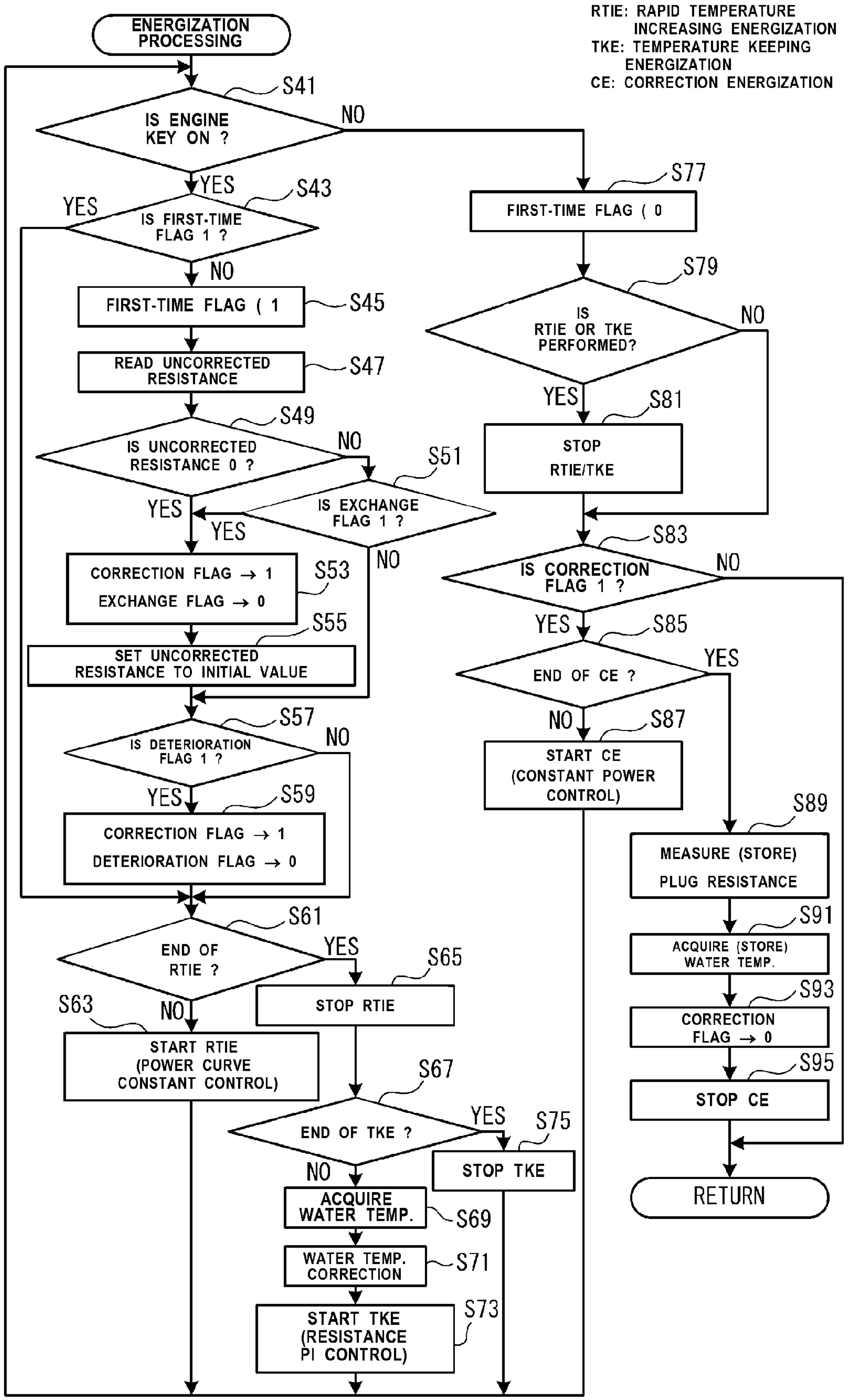
FIG. 8 Flowchart of energization processing according to the third modification.

In the energization processing of FIG. 8, which is executed when the engine key 6 is turned on, after the processing of S45 to S55, which is executed only one time when the engine key 6 is turned on, the CPU 32 checks the state (value) of the deterioration flag (S57). If the value of the deterioration flag is “0,” the CPU 32 proceeds directly to S61 (S57: NO). If the value of the deterioration flag is “1” (S57: YES), the CPU 32 sets the correction flag to “1” and resets the deterioration flag (S59), and then proceeds to S61. As result, as in the case where the above-described exchange flag is set to “1,” the CPU 32 performs the calibration when the engine key 6 is turned on, and then turned off (S41: NO; S83: YES). Notably, the detection of deterioration of the heating resistor 21 is performed every time the checking of exchange of the glow plug 20 is performed in a state where the engine key 6 is off and the microcomputer 31 is in the power save mode. Therefore, after the heating resistor 21 has deteriorated and its resistance has become greater than the deterioration determination value, the heating resistor 21 is determined to have deteriorated every time the deterioration detection is performed, unless the heating resistor 21 is replaced with one not having deteriorated through exchange of the glow plug 20. Therefore, every time the engine 1 is operated and stopped, the calibration is performed, and the target resistance is calculated each time. Therefore, the newest target resistance corresponding to the deteriorated state can be maintained.

However, immediately after stoppage of the engine 1, the temperature of the heating resistor 21 is still high, and its resistance Rg is still large. Therefore, the present modification may be modified to acquire the water temperature information from the ECU 10, correct the resistance Rg on the basis of the water temperature, and compare the corrected resistance Rg and the deterioration determination value. Alternatively, the present modification may be modified to compare the resistance Rg and the deterioration determination value for deterioration determination only when the temperature of cooling water is at a predetermined temperature (e.g., 25° C.) or falls within a predetermined temperature range (e.g., 0° C. to 25° C.). Alternatively, the present modification may be modified not to perform the deterioration determination until a predetermined period of time elapses after stoppage of the engine 1 and the water temperature is considered to have decreased blow the predetermined temperature.

Figure 9:
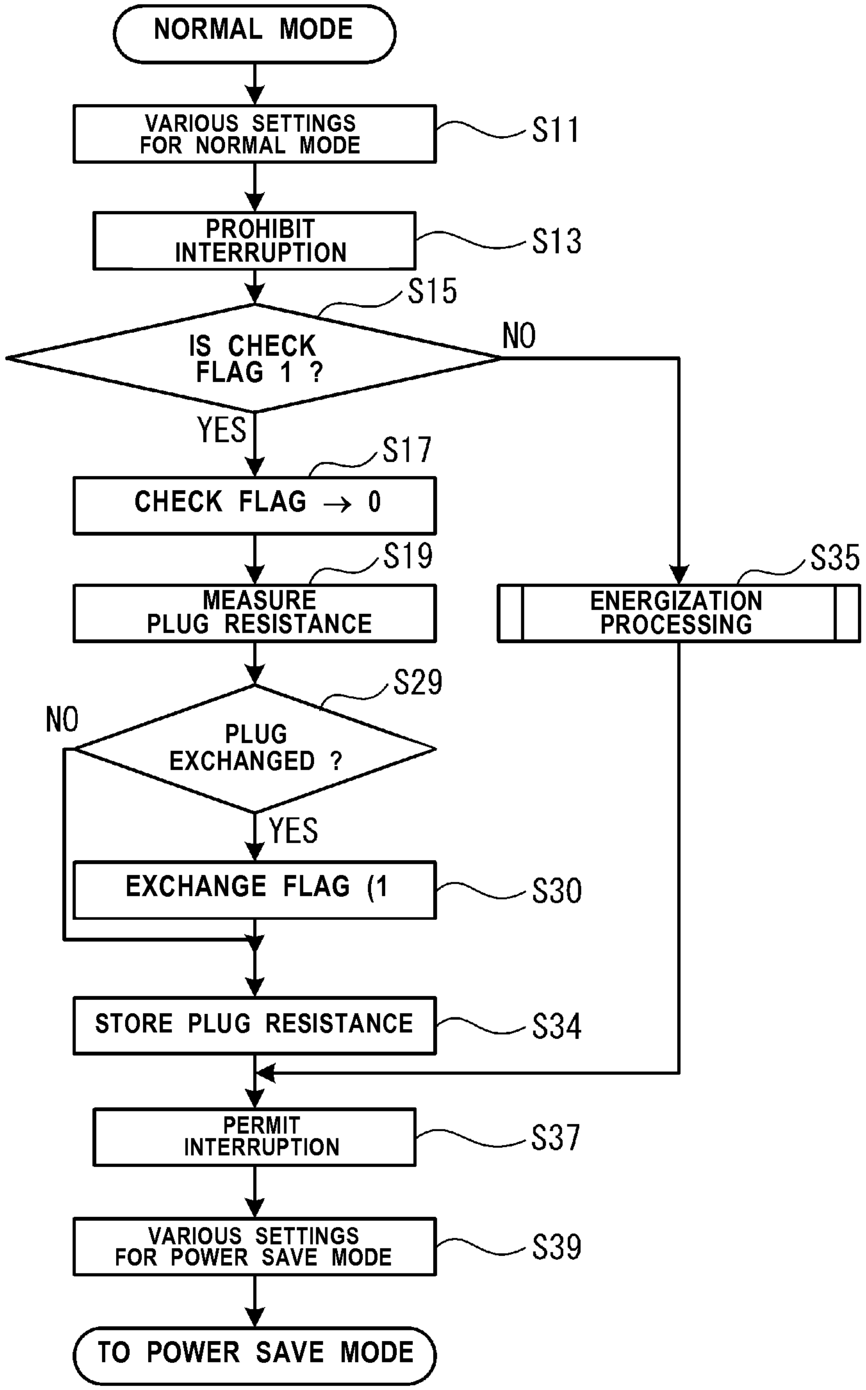
FIG. 9 Flowchart of an energization control program according to a fourth modification.

Moreover, as in a fourth modification of the energization control program shown in FIG. 9, the resistance Rg of the heating resistor 21 obtained in S19 at the time of checking of exchange of the glow plug 20 is memorized in the RAM 34 (S34), and stored. This operation makes it possible to compare the resistance Rg of the heating resistor 21 obtained at the time of the previous exchange checking and the resistance Rg of the heating resistor 21 obtained at the time of the latest exchange checking, and use the result of the comparison for checking of exchange of the glow plug 20. For example, through utilization of the phenomenon that the resistance Rg of the heating resistor 21 increases as the heating resistor 21 deteriorates, it becomes possible to determined that the glow plug 20 has been exchanged, when the resistance Rg of the heating resistor 21 obtained at the time of the latest exchange checking becomes lower than the resistance Rg of the heating resistor 21 obtained at the time of the previous exchange checking. This detection method enables the determination on exchange to be performed without periodically supplying electricity to the heating resistor 21. Since the frequency of the exchange checking can be lowered by means of increasing the intervals of the exchange checking (intervals at which the interruption timer 36 outputs the interruption signal), the consumption of electricity stored in the battery 4 can be reduced. Notably, as in the case of the third modification, the resistance Rg of the heating resistor 21 changes depending on the temperature of the heating resistor 21 at the time of acquisition of the resistance Rg. Therefore, the present modification may be modified to correct the resistance Rg on the basis of the water temperature and perform the exchange determination on the basis of the corrected resistance Rg. Alternatively, the present modification may be modified to obtain the resistance Rg and perform the exchange determination only when the temperature of cooling water is at a predetermined temperature or falls within a predetermined temperature range. Alternatively, the present modification may be modified not to perform the exchange determination until a predetermined period of time elapses after stoppage of the engine 1 and the water temperature is considered to have decreased blow the predetermined temperature. Further, although a detail description is not provided here, in the case where the heater resistor has properties such that its resistance changes stepwise as the heater deteriorates, the present modification may be modified so as to reset the deterioration flag and change the deterioration determination value, to thereby enable the calibration to be performed again. In the present invention, it is important to perform the calibration when the engine is in a stopped state, and no limitation is imposed on the means for detecting the exchange of the heater.

Further, in the above-described embodiment, in S87, the saturation of the temperature rise during the calibration is determined from the elapse of time. However, the embodiment may be modified to continuously obtain the resistance Rg of the heating resistor 21 during the correction energization and determine that the saturation has occurred, when a variation in the resistance Rg becomes smaller than a predetermined value.

DESCRIPTION OF REFERENCE NUMERALS

1: engine
20: glow plug
21: heating resistor
22: heater
30: GCU
31: microcomputer
32: CPU

The invention claimed is:

1. A heater energization control apparatus for controlling energization of a heater having a heating resistor which generates heat upon supply of electricity thereto, wherein the heater constitutes a heat generation section of a glow plug mounted to an internal combustion engine, the apparatus comprising:

first resistance acquisition means, operable when the internal combustion engine to which the heater is mounted remains stopped, for supplying electricity to the heating resistor every time a predetermined wait time elapses and for acquiring, as a first resistance, an electricity supply resistance at that time; and determination means for determining that the glow plug has been exchanged for another same type of glow plug, when the first resistance is greater than a predetermined first reference value, wherein the heating resistor is a heating resistor whose resistance changes with a temperature change thereof in accordance with a positive correlation between the temperature and the resistance;

the heater energization control apparatus is configured to control the supply of electricity to the heating resistor in accordance with a resistance control scheme in which the supply of electricity to the heating resistor is controlled such that the resistance of the heating resistor coincides with a target resistance; and the heater energization control apparatus comprises:

second resistance acquisition means, operable in response to (i) the determination means determining that the glow plug has been exchanged for another same type of glow plug, (ii) the internal combustion engine being operated for a first time after it is determined that the glow plug has been exchanged for another same type of glow plug, and (iii) the internal combustion engine being stopped after being operated the first time once it has been determined that the glow plug has been exchanged for another same type of glow plug, for supplying electricity to the heating resistor, and for acquiring, as a second resistance, the electricity supply resistance at that time;

first information acquisition means, operable when the second resistance is acquired, for acquiring information regarding a temperature of an environment in which the heater is used;

first computation means for computing the target resistance on the basis of the second resistance and the information regarding the environmental temperature; and energization control means, operable when the internal combustion engine is operated, for controlling the supply of electricity to the heating resistor such that the electricity supply resistance at the time when electricity is supplied to the heating resistor coincides with the target resistance.

2. A heater energization control apparatus according to claim 1, wherein the wait time is shorter than a predetermined time required to exchange the glow plug mounted to the internal combustion engine.

3. A heater energization control apparatus according to claim 1, wherein a cumulative amount of electric power which is supplied to the heating resistor when the first resistance acquisition means acquires the first resistance is determined such that a temperature of the heating resistor elevated through the supply of electric power drops to a temperature of the heating resistor before being supplied with the electric power due to natural heat radiation until the next acquisition of the first resistance.

4. A heater energization control apparatus according to claim 1, further comprising first setting means for setting an operation clock of the heater energization control apparatus to generate clock pulses at a first frequency when the internal combustion engine remains stopped, and setting the operation clock to generate clock pulses at a second frequency higher than the first frequency when the first resistance acquisition means acquires the first resistance.

5. A heater energization control apparatus according to claim 1, further comprising second setting means, operable after the determination means determines that the glow plug has been exchanged, for setting the second resistance to its initial value before the energization control means starts the control of the first supply of electricity to the heating resistor.

6. A heater energization control apparatus according to claim 1, further comprising deterioration detection means for detecting deterioration of the heating resistor on the basis of the first resistance, wherein when deterioration of the heating resistor is detected by the deterioration detection means, every time the internal combustion engine is stopped, the second resistance acquisition means acquires the second resistance and the first computation means calculates the target resistance.

7. A heater energization control apparatus according to claim 1, wherein the supply of electricity to the heating resistor by the second resistance acquisition means is performed in accordance with a constant power control scheme such that the cumulative electric energy supplied to the heating resistor becomes equal to a predetermined electric energy.

8. A heater energization control apparatus according to claim 1, wherein the another same type of glow plug is a glow plug having a heating resistor formed of first material which is same as second material used for forming the heating resistor of the glow plug that has been exchanged.

9. A heater energization control apparatus for controlling energization of a heater having a heating resistor which generates heat upon supply of electricity thereto, wherein the heater constitutes a heat generation section of a glow plug mounted to an internal combustion engine, the apparatus comprising:

first resistance acquisition means, operable when the internal combustion engine to which the heater is mounted remains stopped, for supplying electricity to the heating resistor and for acquiring, as a first resistance, an electricity supply resistance at that time;

first information acquisition means, operable when the first resistance is acquired, for acquiring information regarding a temperature of an environment in which the heater is used;

correction means for correcting the first resistance on the basis of the information regarding the environmental temperature to thereby obtain a current corrected resistance value;

first computation means for computing a difference between the current corrected resistance value obtained by the correction means and a past corrected resistance value previously obtained by the correction means;

determination means for determining that the glow plug has been exchanged for another same type of glow plug, when the difference is greater than a predetermined first reference value; and storage means for storing, as the past corrected value, the current corrected value obtained by the correction means, wherein the heating resistor is a heating resistor whose resistance changes with a temperature change thereof in accordance with a positive correlation between the temperature and the resistance;

the heater energization control apparatus is configured to control the supply of electricity to the heating resistor in accordance with a resistance control scheme in which the supply of electricity to the heating resistor is controlled such that the resistance of the heating resistor coincides with a target resistance; and the heater energization control apparatus comprises:

second resistance acquisition means, operable in response to (i) the determination means determining that the glow plug has been exchanged for another same type of glow plug, (ii) the internal combustion engine being operated for a first time after it is determined that the glow plug has been exchanged for another same type of glow plug, and (iii) the internal combustion engine being stopped after being operated the first time once it has been determined that the glow plug has been exchanged for another same type of glow plug, for supplying electricity to the heating resistor, and for acquiring, as a second resistance, the electricity supply resistance at that time;

second information acquisition means, operable when the second resistance is acquired, for acquiring information regarding a temperature of an environment in which the heater is used;

second computation means for computing the target resistance on the basis of the second resistance and the information regarding the environmental temperature acquired by the second information acquisition means; and energization control means, operable when the internal combustion engine is operated, for controlling the supply of electricity to the heating resistor such that the electricity supply resistance at the time when electricity is supplied to the heating resistor coincides with the target resistance.

10. A heater energization control apparatus according to claim 9, wherein, when the past corrected value stored in the storage means is an initial value or zero, the determination means determines that the glow plug has been exchanged.

* * * * *